US010904441B2

United States Patent
Tanaka et al.

(10) Patent No.: US 10,904,441 B2
(45) Date of Patent: Jan. 26, 2021

(54) IMAGING DEVICE, IMAGING CONTROL METHOD, AND PROGRAM

(71) Applicant: FUJIFILM Corporation, Tokyo (JP)

(72) Inventors: Koichi Tanaka, Saitama (JP); Seiichi Izawa, Saitama (JP); Akihiro Uchida, Saitama (JP); Hideo Kobayashi, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/590,402

(22) Filed: Oct. 2, 2019

(65) Prior Publication Data

US 2020/0036899 A1    Jan. 30, 2020

Related U.S. Application Data

(63) Continuation of application No. PCT/JP2018/011216, filed on Mar. 20, 2018.

(30) Foreign Application Priority Data

Apr. 3, 2017 (JP) .................................. 2017-073998

(51) Int. Cl.
H04N 5/232 (2006.01)
H04N 5/225 (2006.01)
G02B 27/64 (2006.01)

(52) U.S. Cl.
CPC ....... H04N 5/23287 (2013.01); G02B 27/646 (2013.01); H04N 5/2254 (2013.01); H04N 5/22525 (2018.08); H04N 5/23258 (2013.01)

(58) Field of Classification Search
CPC .......... H04N 5/23287; H04N 5/22525; H04N 5/2254; H04N 5/23258; G02B 27/646

(Continued)

(56) References Cited

U.S. PATENT DOCUMENTS

| 8,155,512 B2 * | 4/2012 | Honjo | G03B 17/14 |
| | | | 396/55 |
| 9,692,976 B2 * | 6/2017 | Sakurai | G02B 27/646 |

(Continued)

FOREIGN PATENT DOCUMENTS

| JP | 2006-133265 A | 5/2006 |
| JP | 2008-209577 A | 9/2008 |

(Continued)

OTHER PUBLICATIONS

International Search Report issued in PCT/JP2018/011216; dated Jun. 26, 2018.

(Continued)

*Primary Examiner* — Pritham D Prabhakher

(74) *Attorney, Agent, or Firm* — Studebaker & Brackett PC

(57) ABSTRACT

An imaging device includes: a lens-side suppression unit that moves an anti-vibration lens, which is provided in an interchangeable imaging lens mounted on an imaging device body including an imaging element, to a position, which is determined according to a detection result of a detection unit detecting vibration applied to a device, to suppress an influence of the vibration on a subject image; an imaging element-side suppression unit that moves the imaging element to suppress a shift in an angle of view caused by the movement of the anti-vibration lens; and a control unit that performs control on the lens-side suppression unit to limit a movable range of the anti-vibration lens, which is moved by the lens-side suppression unit, on the basis of the amount of the maximum shift in the angle of view caused by the movement of the imaging element performed by the imaging element-side suppression unit.

12 Claims, 16 Drawing Sheets

(58) Field of Classification Search
USPC .................................................. 348/208.11
See application file for complete search history.

(56) References Cited

U.S. PATENT DOCUMENTS

| | | | | |
|---|---|---|---|---|
| 9,866,737 | B2* | 1/2018 | Uemura | H04N 5/232939 |
| 9,876,958 | B2* | 1/2018 | Sakurai | H04N 5/23209 |
| 10,171,739 | B2* | 1/2019 | Honjo | H04N 5/23258 |
| 10,313,593 | B2* | 6/2019 | Miyahara | H04N 5/23287 |
| 2005/0140793 | A1* | 6/2005 | Kojima | H04N 5/23287 |
| | | | | 348/208.99 |
| 2015/0160469 | A1* | 6/2015 | Wakamatsu | H04N 5/23258 |
| | | | | 348/208.11 |
| 2015/0281581 | A1 | 10/2015 | Sakurai et al. | |
| 2015/0281582 | A1* | 10/2015 | Sakurai | H04N 5/23287 |
| | | | | 348/208.2 |
| 2016/0134796 | A1* | 5/2016 | Kaneko | G03B 43/00 |
| | | | | 348/208.11 |
| 2016/0165111 | A1* | 6/2016 | Uemura | H04N 5/23287 |
| | | | | 348/208.11 |
| 2016/0261806 | A1* | 9/2016 | Honjo | H04N 5/23209 |
| 2017/0257574 | A1* | 9/2017 | Honjo | H04N 5/23258 |
| 2018/0288331 | A1* | 10/2018 | Kadowaki | G03B 17/56 |
| 2018/0307004 | A1* | 10/2018 | Nagaoka | H04N 5/23287 |
| 2018/0348538 | A1* | 12/2018 | Sugawara | H04N 5/23287 |

FOREIGN PATENT DOCUMENTS

| | | |
|---|---|---|
| JP | 2015-194712 A | 11/2015 |
| JP | 2016-167801 A | 9/2016 |

OTHER PUBLICATIONS

International Preliminary Report on Patentability and Written Opinion issued in PCT/JP2018/011216; dated Oct. 8, 2019.

* cited by examiner

IMAGING DEVICE, IMAGING CONTROL METHOD, AND PROGRAM

CROSS-REFERENCE TO RELATED APPLICATIONS

This application is a continuation application of International Application No. PCT/JP2018/011216, filed Mar. 20, 2018, the disclosure of which is incorporated herein by reference in its entirety. Further, this application claims priority from Japanese Patent Application No. 2017-073998, filed Apr. 3, 2017, the disclosure of which is incorporated herein by reference in its entirety.

BACKGROUND

1. Technical Field

A technique of the present disclosure relates to an imaging device, an imaging control method, and a program.

2. Related Art

An imaging device is provided with an imaging element that receives reflected light representing a subject as a subject image. In a case where shake, which is a phenomenon where an imaging device is vibrated due to the transmission of the vibration of user's hands to the imaging device, occurs, image blur, which is a phenomenon where a subject image is shifted from a specific position (for example, the position of a subject image to be obtained in a state where shake does not occur, occurs with the shake. Image blur is visually recognized by a user through an image that is obtained from imaging performed by an imaging element.

Image blur is not a phenomenon that occurs due to only shake. For example, in a case where an imaging device is installed on a vehicle, image blur may occur due to the transmission of the vibration of a vehicle to the imaging device.

An imaging device (hereinafter, referred to as "an imaging device already known in the related art") having an optical-image-stabilizer (OIS) function and a body-image-stabilizer (BIS) function is known as an imaging device that suppresses image blur.

Here, the OIS function refers to a function to move an anti-vibration lens, which is mounted on an imaging lens, to suppress image blur and the like. Here, the BIS function refers to a function to move an imaging element, such as a charge coupled device (CCD) image sensor, to suppress image blur and the like.

In the imaging device already known in the related art, image blur occurring during the display of a live view image is suppressed by the OIS function. Here, the live view image is also referred to as a through image, is a continuous frame image that is obtained from the imaging of a subject with a continuous frame, and is continuously displayed on the screen of a display device, such as a liquid crystal display (LCD).

However, since the anti-vibration lens is moved and subject light is refracted in the case of the OIS function, aberration in a case where the anti-vibration lens is stopped is different from aberration in a case where the anti-vibration lens is moved. As a result, there is a concern that the quality of an image obtained from imaging may deteriorate. For this reason, to suppress the deterioration of image quality, it is preferable that the anti-vibration lens is not moved from a reference position. Here, the reference position refers to the position of the anti-vibration lens in a state where vibration is not applied to the imaging device, that is, the position of the anti-vibration lens in a case where the center of the anti-vibration lens coincides with an optical axis.

In imaging devices disclosed in JP2016-167801A and JP2015-194712A, an anti-vibration lens is centered by the time when the main exposure is started after the display of a live view image is stopped in a case where a condition where main exposure is to be started is satisfied during the display of a live view image. Then, a shift in the angle of view caused by the centering of the anti-vibration lens is suppressed by a BIS function. "The centering of the anti-vibration lens" refers to an operation for returning the anti-vibration lens to a reference position. Here, "a shift in the angle of view" refers to a shift in the angle of view of an image displayed on the display device.

SUMMARY

However, since an imaging lens has an OIS function in the imaging devices disclosed in JP2016-167801A and JP2015-194712A, a difference may occur between the amount of shift in the angle of view caused by the OIS function and the amount of shift in the angle of view caused by the BIS function in a case where the imaging lens is interchanged. The amount of shift in the angle of view caused by the OIS function refers to the amount of shift in the angle of view in a case where the anti-vibration lens is moved with a full stroke by the OIS function. Further, the amount of shift in the angle of view caused by the BIS function refers to the amount of shift in the angle of view in a case where the imaging element is moved with a full stroke by the BIS function.

In a case where a difference occurs between the amount of shift in the angle of view caused by the OIS function and the amount of shift in the angle of view caused by the BIS function as described above, a shift in the angle of view caused by the centering of the anti-vibration lens may not be cancelled by the BIS function.

An embodiment of the invention provides an imaging device, an imaging control method, and a program that can achieve both the suppression of deterioration of image quality and the suppression of a shift in the angle of view.

An imaging device according to a first aspect comprises: a lens-side suppression unit that moves an anti-vibration lens, which is provided in an interchangeable imaging lens mounted on an imaging device body including an imaging element receiving reflected light representing a subject as a subject image, to a position, which is determined according to a detection result of a detection unit detecting vibration applied to a device, to suppress an influence of the vibration on the subject image; an imaging element-side suppression unit that moves the imaging element to suppress a shift in an angle of view caused by the movement of the anti-vibration lens; and a control unit that performs control on the lens-side suppression unit to limit a movable range of the anti-vibration lens, which is moved by the lens-side suppression unit, on the basis of an imaging element-side maximum shift amount which is the amount of the maximum shift in the angle of view caused by the movement of the imaging element performed by the imaging element-side suppression unit.

Therefore, according to the imaging device of the first aspect, it is possible to achieve both the suppression of deterioration of image quality and the suppression of a shift in the angle of view.

According to a second aspect, in the imaging device according to the first aspect, the control unit performs control on a display unit, which displays an image, to display the subject image, which is received by the imaging element, as a video, and performs control on the lens-side suppression unit to suppress the influence by moving the anti-vibration lens to the position that is determined according to the detection result in a limited movable range, which is a movable range limited to be equal to or narrower than an imaging element-movable range that is the maximum movable range of the imaging element moved by the imaging element-side suppression unit, during the display of the video on the display unit in a case where the imaging element-side maximum shift amount is smaller than a lens-side maximum shift amount, which is the amount of the maximum shift in the angle of view caused by the movement of the anti-vibration lens performed by the lens-side suppression unit.

Therefore, according to the imaging device of the second aspect, it is possible to achieve both the suppression of deterioration of image quality and the suppression of the influence of vibration, which is applied to the device, on the subject image during the display of a video.

According to a third aspect, in the imaging device according to the second aspect, the limited movable range is determined on the basis of the imaging element-movable range.

Therefore, according to the imaging device of the third aspect, the limited movable range can be accurately prescribed as compared to a case where the limited movable range is prescribed without using the imaging element-movable range.

According to a fourth aspect, in the imaging device according to the second aspect, the limited movable range is determined on the basis of the imaging element-movable range and a focal length of the imaging lens.

Therefore, according to the imaging device of the fourth aspect, the limited movable range can be accurately prescribed as compared to a case where the limited movable range is prescribed without using the imaging element-movable range and the focal length of the imaging lens.

According to a fifth aspect, the imaging device according to the second aspect further comprises a focus lens and the limited movable range is determined on the basis of the imaging element-movable range, a focal length of the imaging lens, and a position of the focus lens.

Therefore, according to the imaging device of the fifth aspect, the limited movable range can be accurately prescribed as compared to a case where the limited movable range is prescribed without using the imaging element-movable range, the focal length of the imaging lens, and the position of the focus lens.

According to a sixth aspect, in the imaging device according to any one of the second to fifth aspects, the control unit performs control on the lens-side suppression unit to center the anti-vibration lens in the limited movable range by the time when a main exposure-start condition where the imaging element is to be caused to start main exposure is satisfied and the main exposure is started.

Therefore, according to the imaging device of the sixth aspect, a shift between the angle of view of a video and the angle of view of an image, which is obtained from main exposure, can be reduced as compared to a case where the anti-vibration lens is centered in a range narrower than the limited movable range.

According to a seventh aspect, in the imaging device according to the first aspect, the control unit performs control on the lens-side suppression unit to move the anti-vibration lens in a direction of the centering in a limited movable range, which is a movable range limited to be equal to or narrower than an imaging element-movable range that is the maximum movable range of the imaging element moved by the imaging element-side suppression unit, in a case where a lens-side shift amount that is the amount of shift in the angle of view caused by the centering of the anti-vibration lens exceeds the imaging element-side maximum shift amount, by the time when a main exposure-start condition where the imaging element is to be caused to start main exposure is satisfied and the main exposure is started.

Therefore, according to the imaging device of the seventh aspect, a shift in the angle of view before and after main exposure can be suppressed as compared to a case where the anti-vibration lens is not moved in the direction of centering.

According to an eighth aspect, in the imaging device according to the seventh aspect, the control unit performs control on the lens-side suppression unit to suppress the influence by moving the anti-vibration lens to the position that is determined according to the detection result in an anti-vibration lens-movable range, which is the maximum movable range of the anti-vibration lens, after the anti-vibration lens is moved to an initial position at which an operation of the anti-vibration lens required for the suppression of the influence is started and which is determined according to a degree of difference between the lens-side shift amount and the imaging element-side maximum shift amount.

Therefore, according to the imaging device of the eighth aspect, the initial position at which an operation of the anti-vibration lens required for the suppression of the influence of vibration, which is applied to the device, on the subject image is started is always constant, and both the influence of vibration, which is applied to the device, on the subject image and a shift in the angle of view before and after main exposure can be suppressed as compared to a case where the anti-vibration lens is moved to a position determined according to the detection result of the detection unit in a movable range narrower than the anti-vibration lens-movable range.

According to a ninth aspect, in the imaging device according to any one of the first to eighth aspects, the control unit performs control on the imaging element-side suppression unit and the lens-side suppression unit to center the imaging element with an end of the main exposure of the imaging element and to move the anti-vibration lens to a position where a shift in the angle of view caused by the centering of the imaging element is suppressed.

Therefore, according to the imaging device of the ninth aspect, a shift in the angle of view before and after the end of main exposure can be suppressed as compared to a case where the imaging element is not moved despite the centering of the anti-vibration lens in a case where main exposure ends.

According to a tenth aspect, in the imaging device according to any one of the first to ninth aspects, the control unit performs control on the lens-side suppression unit to limit the movable range of the anti-vibration lens, which is moved by the lens-side suppression unit, on the basis of the imaging element-side maximum shift amount in a case where a characteristic of the imaging lens coincides with a predetermined characteristic.

Therefore, according to the imaging device of the tenth aspect, it is possible to avoid unnecessarily performing control by the control unit as compared to a case where control is performed by the control unit regardless of the characteristics of the imaging lens.

An imaging control method according to an eleventh aspect comprises performing control on a lens-side suppression unit to limit a movable range of an anti-vibration lens, which is moved by the lens-side suppression unit, on the basis of an imaging element-side maximum shift amount which is the amount of the maximum shift in an angle of view caused by the movement of an imaging element performed by an imaging element-side suppression unit of an imaging device. The imaging device includes the lens-side suppression unit that moves the anti-vibration lens, which is provided in an interchangeable imaging lens mounted on an imaging device body including the imaging element receiving reflected light representing a subject as a subject image, to a position, which is determined according to a detection result of a detection unit detecting vibration applied to a device, to suppress an influence of the vibration on the subject image, and the imaging element-side suppression unit that moves the imaging element to suppress a shift in the angle of view caused by the movement of the anti-vibration lens.

According to the imaging control method of the eleventh aspect, it is possible to achieve both the suppression of deterioration of image quality and the suppression of a shift in the angle of view.

A program according to a twelfth aspect causes a computer to perform processing including: performing control on a lens-side suppression unit to limit a movable range of an anti-vibration lens, which is moved by the lens-side suppression unit, on the basis of an imaging element-side maximum shift amount which is the amount of the maximum shift in an angle of view caused by the movement of an imaging element performed by an imaging element-side suppression unit of an imaging device. The imaging device includes the lens-side suppression unit that moves the anti-vibration lens, which is provided in an interchangeable imaging lens mounted on an imaging device body including the imaging element receiving reflected light representing a subject as a subject image, to a position, which is determined according to a detection result of a detection unit detecting vibration applied to a device, to suppress an influence of the vibration on the subject image, and the imaging element-side suppression unit that moves the imaging element to suppress a shift in the angle of view caused by the movement of the anti-vibration lens.

According to the program of the twelfth aspect, it is possible to achieve both the suppression of deterioration of image quality and the suppression of a shift in the angle of view.

According to an embodiment of the invention, it is possible to obtain an effect of achieving both the suppression of deterioration of image quality and the suppression of a shift in the angle of view.

BRIEF DESCRIPTION OF THE DRAWINGS

Exemplary embodiments according to the technique of the present disclosure will be described in detail based on the following figures, wherein.

DESCRIPTION

An example of an embodiment of an imaging device according to a technique of the disclosure will be described below with reference to accompanying drawings.

In the following description, "perpendicular" refers to perpendicular in terms of including an error within an allowable range. Further, in the following description, "coincidence" refers to coincidence in terms of including an error within an allowable range.

Furthermore, "CPU" is an abbreviation for "Central Processing Unit" in the following description. Further, "I/F" is an abbreviation for "Interface" in the following description. Furthermore, "ASIC" is an abbreviation for "Application Specific Integrated Circuit" in the following description. Moreover, "FPGA" is an abbreviation for "Field-Programmable Gate Array" in the following description.

Further, "RAM" is an abbreviation for "Random Access Memory" in the following description. Furthermore, "EEPROM" is an abbreviation for "Electrically Erasable Programmable Read-Only Memory" in the following description. Moreover, "SSD" is an abbreviation for "Solid State Drive" in the following description. Further, CD-ROM is an abbreviation for "Compact Disc Read Only Memory" in the following description.

Furthermore, "JPEG" is an abbreviation for "Joint Photographic Experts Group" in the following description. Moreover, "MPEG" is an abbreviation for "Moving Picture Experts Group" in the following description. Further, "USB" is an abbreviation for "Universal Serial Bus" in the following description.

Furthermore, CMOS is an abbreviation for "Complementary Metal-Oxide-Semiconductor" in the following description. Further, "AE" is an abbreviation for "Auto Exposure" in the following description. Furthermore, "AF" is an abbreviation for "Auto Focus" in the following description.

First Embodiment

Figure 1:
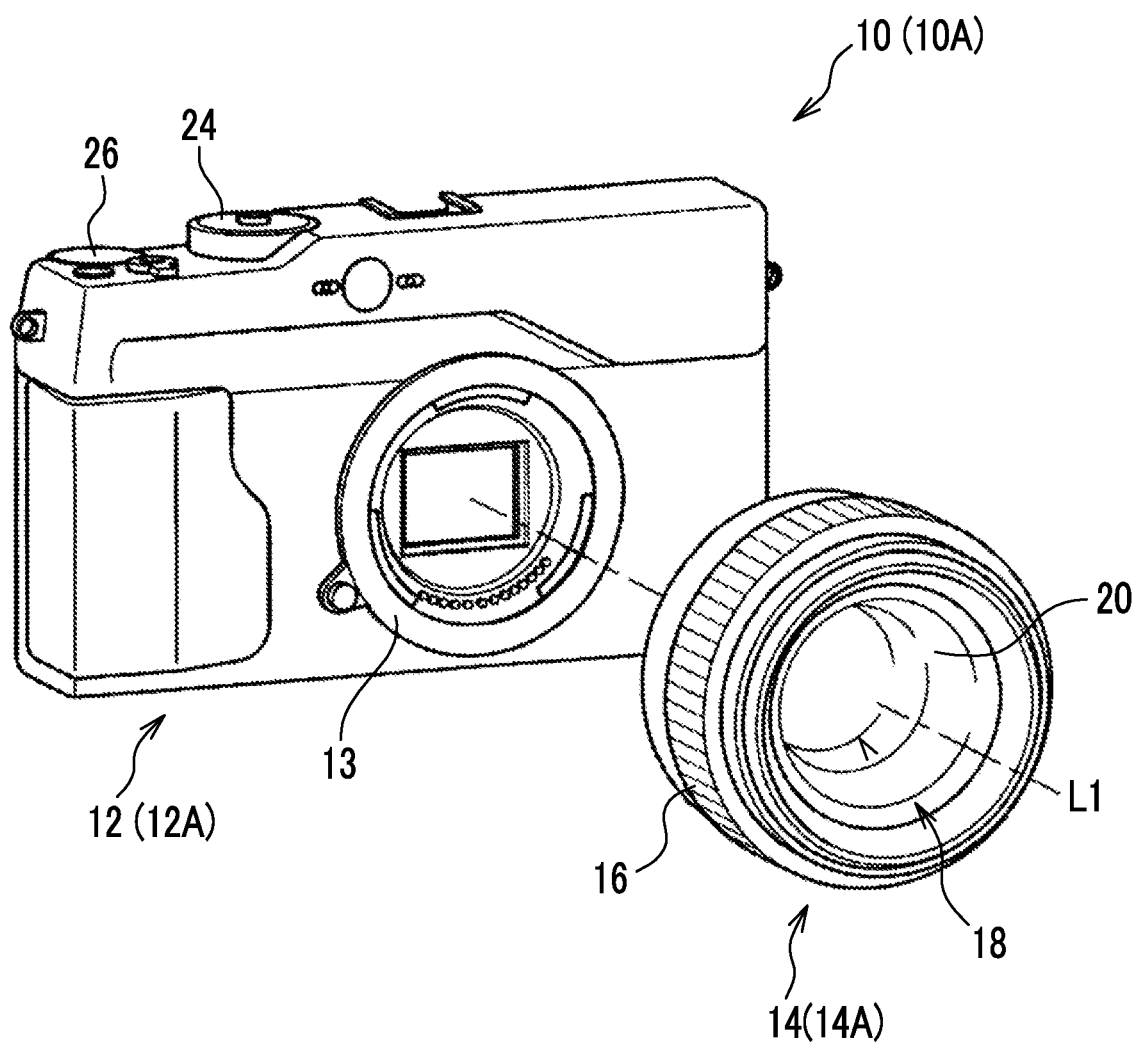
FIG. 1 is a perspective view showing an example of the appearance of imaging devices according to first and second embodiments.

As shown in, for example, FIG. 1, an imaging device 10 is a lens-interchangeable digital camera and includes an imaging device body 12 and an imaging lens 14. The imaging lens 14 is mounted on the imaging device body 12 to be interchangeable.

A lens barrel of the imaging lens 14 is provided with a focus ring 16 that is used in a manual focus mode. The imaging lens 14 includes a lens unit 18. The lens unit 18 is a combination lens where a plurality of lenses including a focus lens 20 are combined. The focus lens 20 is moved in the direction of an optical axis L1 with an operation for manually rotating the focus ring 16, and subject light, which is reflected light representing a subject, forms an image on a light-receiving surface 22A (see FIG. 3) of an imaging element 22 to be described later at a focusing position corresponding to a subject distance.

A dial 24 and a release button 26 are provided on the upper surface of the imaging device body 12. The dial 24 is operated in a case where various kinds of setting, such as the switching of an imaging mode and a playback mode, are to be performed. Accordingly, the dial 24 is operated by a user, so that the imaging mode and the playback mode are selectively set as an operating mode in the imaging device 10.

The imaging device 10 has a static image taking mode and a video imaging mode as the operating mode of an imaging system. The static image taking mode is an operating mode where a static image obtained from the imaging of a subject is recorded, and the video imaging mode is an operating mode where a video obtained from the imaging of a subject is recorded.

The static image taking mode and the video imaging mode are selectively set in the imaging device 10 under the imaging mode according to an instruction that is given to the imaging device 10 from a user. Further, a manual focus mode and an autofocus mode are selectively set in the static image taking mode according to an instruction that is given to the imaging device 10 from a user.

The release button 26 is adapted so that two-stage pressing operations of an imaging-preparation instruction state and an imaging instruction state can be detected. The imaging-preparation instruction state refers to, for example, a state where the release button is pressed down to an intermediate position (half-pressed position) from a stand-by position, and the imaging instruction state refers to a state where the release button is pressed down to a final pressed-down position (fully-pressed position) over the intermediate position. In the following description, "a state where the release button is pressed down to the half-pressed position from the stand-by position" will be referred to as a "half-pressed state" and "a state where the release button is pressed down to the fully-pressed position from the stand-by position" will be referred to as a "fully-pressed state".

In the autofocus mode, the release button 26 is made to be in the half-pressed state to adjust imaging conditions and is then made to be in the fully-pressed state to perform main exposure. That is, in a case where the release button 26 is made to be in the half-pressed state, focusing is controlled by the action of an AF function after an exposure state is set by the action of an AE function. In a case where the release button 26 is made to be in the fully-pressed state, imaging is performed.

Figure 2:
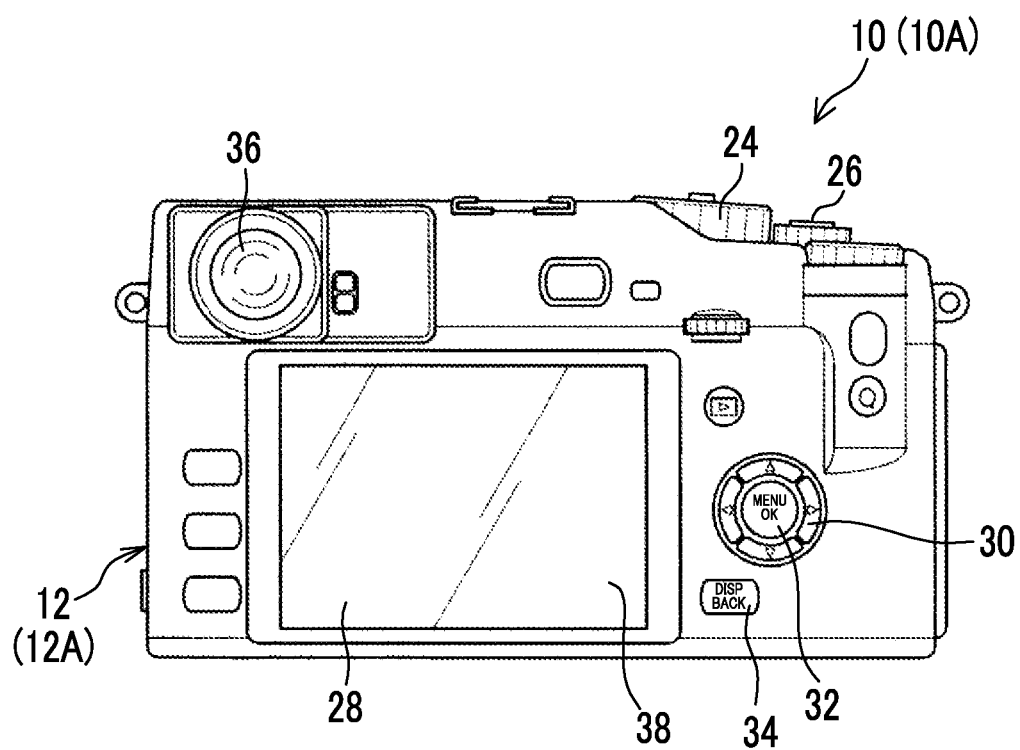
FIG. 2 is a back view showing the back sides of the imaging devices according to the first and second embodiments.

As shown in, for example, FIG. 2, a display 28, a cross key 30, a MENU/OK key 32, a BACK/DISP button 34, and a finder 36 are provided on the back of the imaging device body 12.

The display 28 is, for example, an LCD and displays an image that is obtained from the imaging of a subject performed by the imaging device 10, characters, and the like. The display 28 is used for the display of a live view image in the imaging mode. Further, the display 28 is also used for the display of a static image that is obtained from imaging with a single frame in a case where an instruction to take a static image is given. Furthermore, the display 28 is also used for the display of a playback image played back in a playback mode and the display of a menu screen, and the like.

A transmission-type touch panel 38 is laminated on the surface of the display area of the display 28. The touch panel 38 detects contact between itself and a pointer body, such as a finger or a stylus pen. The touch panel 38 outputs detection result information, which represents the result of detection of whether or not the pointer body comes into contact with the touch panel 38, to a predetermined output destination (for example, a CPU 74 (see FIG. 3) to be described later) at a predetermined interval (for example, 100 msec.). The detection result information includes two-dimensional coordinates (hereinafter, referred to as "coordinates") that can specify a contact position on the touch panel 38 where the pointer body comes into contact with the touch panel 38 in a case where the touch panel 38 detects contact between itself and the pointer body, and does not include the coordinates in a case where the touch panel 38 does not detect contact between itself and a pointer body.

The cross key 30 functions as a multifunction key that outputs various command signals for the selection of one or a plurality of menus, zoom, frame advance, and the like. The MENU/OK key 32 is an operation key having both a function as a menu button for giving a command to display one or a plurality of menus on the screen of the display 28 and a function as an OK button for giving a command to determine and perform selected contents and the like. The BACK/DISP button 34 is used for the deletion of a desired object, such as a selected item, the cancellation of designated contents, the return of an operation state to a previous operation state, or the like.

Figure 3:
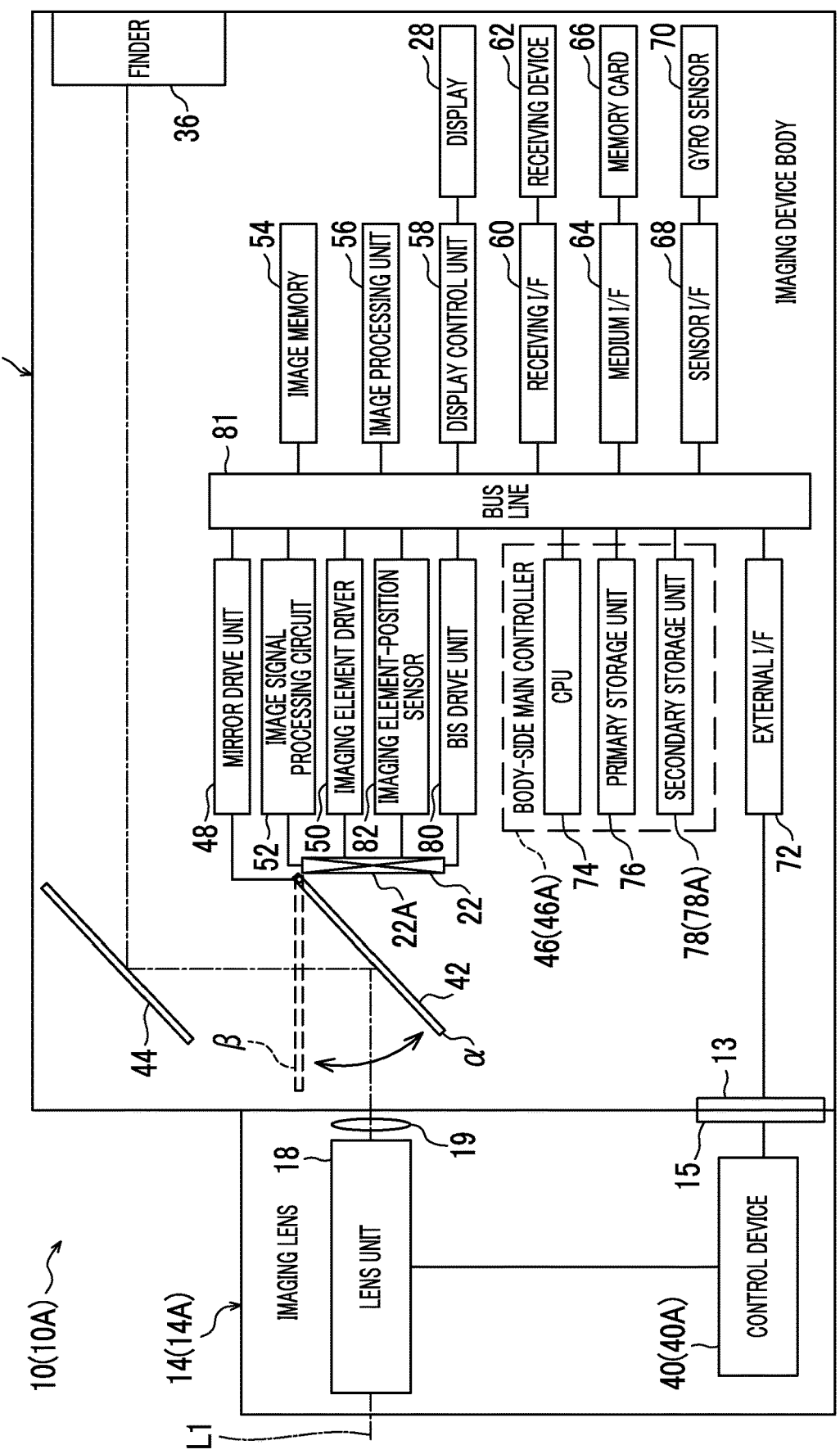
FIG. 3 is a block diagram showing an example of the hardware configuration of the imaging devices according to the first and second embodiments.

FIG. 3 is a block diagram of an electrical system showing an example of the hardware configuration of the imaging device 10 according to the first embodiment.

The imaging device body 12 comprises a mount 13 (see also FIG. 1), and the imaging lens 14 comprises a mount 15. The mount 15 is joined to the mount 13, so that the imaging lens 14 is mounted on the imaging device body 12 to be interchangeable.

The imaging lens 14 includes the lens unit 18, a stop 19, and a control device 40. The stop 19 is provided closer to the imaging device body 12 than the lens unit 18, and adjusts the amount of subject light transmitted through the lens unit 18 and guides the subject light into the imaging device body 12.

The control device 40 is electrically connected to the imaging device body 12 through the mounts 13 and 15, and controls the entire imaging lens 14 according to an instruction from the imaging device body 12.

The imaging device body 12 includes an imaging element 22, a first mirror 42, a second mirror 44, a body-side main controller 46, a mirror drive unit 48, an imaging element driver 50, an image signal processing circuit 52, an image memory 54, an image processing unit 56, and a display control unit 58. Further, the imaging device body 12 includes a receiving I/F 60, a receiving device 62, a medium I/F 64, a memory card 66, a sensor I/F 68, a gyro sensor 70, and an external I/F 72. Furthermore, the imaging device body 12 includes a BIS drive unit 80 and an imaging element-position sensor 82.

The body-side main controller 46 is an example of a computer according to the technique of the disclosure, and comprises a CPU 74, a primary storage unit 76, and a secondary storage unit 78. The CPU 74 controls the entire imaging device 10. The primary storage unit 76 is a volatile memory that is used as a work area and the like at the time of execution of various programs. Examples of the primary storage unit 76 include a RAM. The secondary storage unit 78 is a non-volatile memory that stores various programs, various parameters, and the like in advance. Examples of the secondary storage unit 78 include an EEPROM, a flash memory, and the like.

The CPU 74, the primary storage unit 76, and the secondary storage unit 78 are connected to a bus line 81. Further, the mirror drive unit 48, the imaging element driver 50, and the image signal processing circuit 52 are also connected to the bus line 81. Furthermore, the image memory 54, the image processing unit 56, the display control unit 58, the receiving I/F 60, the medium I/F 64, and the sensor I/F 68 are also connected to the bus line 81. Moreover, the BIS drive unit 80 and the imaging element-position sensor 82 are also connected to the bus line 81.

The first mirror 42 is a movable mirror that is interposed between the light-receiving surface 22A of the imaging element 22 and the lens unit 18 and is movable between a light-receiving surface covering position α and a light-receiving surface opening position β.

The first mirror 42 is connected to the mirror drive unit 48, and the mirror drive unit 48 drives the first mirror 42 under the control of the CPU 74 to selectively dispose the first mirror 42 at the light-receiving surface covering position α and the light-receiving surface opening position β. That is, the first mirror 42 is disposed at the light-receiving surface covering position α by the mirror drive unit 48 in a case where subject light is not to be received by the light-receiving surface 22A, and is disposed at the light-receiving surface opening position β by the mirror drive unit 48 in a case where subject light is to be received by the light-receiving surface 22A.

At the light-receiving surface covering position α, the first mirror 42 covers the light-receiving surface 22A and reflects the subject light sent from the lens unit 18 to guide the subject light to the second mirror 44. The second mirror 44 reflects subject light, which is guided from the first mirror 42, to guide the subject light to the finder 36 through an optical system (not shown). The finder 36 transmits the subject light that is guided by the second mirror 44.

At the light-receiving surface opening position β, a state where the light-receiving surface 22A is covered with the first mirror 42 is released and subject light is received by the light-receiving surface 22A without being reflected by the first mirror 42.

The imaging element driver 50 is connected to the imaging element 22, and supplies driving pulses to the imaging element 22 under the control of the CPU 74. The respective pixels of the imaging element 22 are driven according to the driving pulses that are supplied by the imaging element driver 50. A CCD image sensor is used as the imaging element 22 in the first embodiment, but the technique of the disclosure is not limited thereto and other image sensors, such as a CMOS image sensor, may be used.

The image signal processing circuit 52 reads image signals corresponding to one frame for each pixel from the imaging element 22 under the control of the CPU 74. The image signal processing circuit 52 performs various kinds of processing, such as correlative double sampling processing, automatic gain control, and A/D conversion, on the read image signals. The image signal processing circuit 52 outputs the image signals, which are digitized by various kinds of processing performed on the image signals, to the image memory 54 for each frame at a specific frame rate (for example, several tens of frames/s) that is prescribed according to a clock signal supplied from the CPU 74.

The image memory 54 temporarily keeps the image signals that are input from the image signal processing circuit 52.

The image processing unit 56 acquires image signals from the image memory 54 for each frame at a specific frame rate, and performs various kinds of processing, such as gamma correction, luminance/color difference conversion, and compression processing, on the acquired image signals. Further, the image processing unit 56 outputs the image signals, which are obtained through the various kinds of processing, to the display control unit 58 for each frame at a specific frame rate. Furthermore, the image processing unit 56 outputs the image signals, which are obtained through the various kinds of processing, to the CPU 74 in response to the request of the CPU 74.

The display control unit 58 is connected to the display 28, and controls the display 28 under the control of the CPU 74. Further, the display control unit 58 outputs the image signals, which are input from the image processing unit 56, to the display 28 for each frame at a specific frame rate.

The display 28 displays an image, which is represented by the image signals input from the display control unit 58 at a specific frame rate, as a live view image. Furthermore, the display 28 also displays a static image that is a single frame image obtained from imaging with a single frame. A playback image, a menu screen, and the like are displayed on the display 28 in addition to a live view image.

The receiving device 62 includes the dial 24, the release button 26, the cross key 30, the MENU/OK key 32, the BACK/DISP button 34, the touch panel 38, and the like, and receives various instructions from a user.

The receiving device 62 is connected to the receiving I/F 60 and outputs instruction content signals, which represent the contents of received instructions, to the receiving I/F 60. The receiving I/F 60 outputs the instruction content signals, which are input from the receiving device 62, to the CPU 74.

The CPU 74 performs processing corresponding to the instruction content signals that are input from the receiving I/F 60.

The medium I/F 64 is connected to the memory card 66 and records and reads an image file in and from the memory card 66 under the control of the CPU 74. Under the control of the CPU 74, the image file, which is read from the memory card 66 by the medium I/F 64, is subjected to decompression processing by the image processing unit 56 and is displayed on the display 28 as a playback image. The "image file" mentioned here is broadly classified into a static image file representing a static image and a video file representing a video.

An operating mode is switched in the imaging device 10 according to an instruction that is received by the receiving device 62. For example, the static image taking mode and the video imaging mode are selectively set in the imaging device 10 under the imaging mode according to an instruction that is received by the receiving device 62. A static image file can be recorded in the memory card 66 under the static image taking mode, and a video file can be recorded in the memory card 66 under the video imaging mode.

In a case where an instruction to take a static image is received by the release button 26 under the static image taking mode, the CPU 74 controls the imaging element driver 50 to cause the imaging element 22 to perform main exposure corresponding to one frame. The image processing unit 56 acquires image signals, which are obtained from the exposure corresponding to one frame, under the control of the CPU 74, and performs compression processing on the acquired image signals to generate a static image file having a specific static image format. Here, the specific static image format refers to, for example, a JPEG format. The static image file is recorded in the memory card 66 through the medium I/F 64 by the image processing unit 56 under the control of the CPU 74.

In a case where an instruction to take a video is received by the release button 26 under the video imaging mode, the image processing unit 56 performs compression processing on image signals for a live view image to generate a video file having a specific video format. Here, the specific video format refers to, for example, a MPEG format. The video file is recorded in the memory card 66 through the medium I/F 64 by the image processing unit 56 under the control of the CPU 74.

The gyro sensor 70 is connected to the sensor I/F 68, detects angular velocities in a yaw direction, a roll direction, and a pitch direction, and outputs angular velocity information, which represents the detected angular velocities, to the sensor I/F 68. The sensor I/F 68 outputs the angular velocity information, which is input from the gyro sensor 70, to the CPU 74. The CPU 74 performs processing corresponding to the angular velocity information that is input from the sensor I/F 68. The angular velocity information is an example of detection results according to the technique of the disclosure.

The BIS drive unit 80 is connected to the imaging element 22, and moves the imaging element 22 under the control of the CPU 74. The imaging element 22 and the BIS drive unit 80 are an example of an imaging element-side suppression unit according to the technique of the disclosure.

The BIS drive unit 80 moves the imaging element 22 to suppress a shift in the angle of view that is caused by the movement of an anti-vibration lens 94 to be described later. Here, the shift in the angle of view refers to a shift in the angle of view of an image that is obtained from imaging performed by the imaging device 10 and is displayed on the display 28.

Further, the BIS drive unit 80 suppresses the influence of vibration, which is applied to the imaging device 10, on a subject image on the basis of the detection results of the gyro sensor 70. The influence of vibration, which is applied to the imaging device 10, on a subject image is broadly classified into a rotation influence and a non-rotation influence. For the convenience of description, the rotation influence and the non-rotation influence will be simply referred to as "blurring influences" in the following description in a case where the rotation influence and the non-rotation influence do not need to be described while being distinguished from each other.

The rotation influence refers to an influence for rotating a subject image about an optical axis L1 among the influences of vibration, which is applied to the imaging device 10, on the subject image. The non-rotation influence refers to an influence different from the rotation influence among the influences of vibration, which is applied to the imaging device 10, on the subject image.

The BIS drive unit 80 includes a driving source (not shown) for an imaging element that generates power to be applied to the imaging element 22. Examples of the driving source for an imaging element include a magnet, a flat coil, and a stepping motor.

Rotation influence-suppression processing means processing referred to as so-called roll correction, and refers to processing for suppressing the rotation influence by rotating the imaging element 22 about the optical axis L1 on the basis of the detection results of the gyro sensor 70. In contrast, non-rotation influence-suppression processing refers to processing for suppressing the non-rotation influence by moving the imaging element 22 straight in a first predetermined plane on the basis of the detection results of the gyro sensor 70. Here, "in a first predetermined plane" refers to, for example, "in a two-dimensional plane" perpendicular to the optical axis L1 in a state where vibration is not applied to the imaging device 10. For the convenience of description, the rotation influence-suppression processing and the non-rotation influence-suppression processing performed by the BIS drive unit 80 will be referred to as "BIS processing" in the following description in a case where the rotation influence-suppression processing and the non-rotation influence-suppression processing do not need to be described while being distinguished from each other.

The imaging element-position sensor 82 includes, for example, a magnet and a hall element, and detects the position of the imaging element 22 in the first predetermined plane and outputs imaging element-position information, which represents the detected position, to the CPU 74. The CPU 74 calculates imaging element-destination information which represents a destination where the blurring influence can be suppressed as the destination of the imaging element 22 in the BIS processing, that is, the destination of the imaging element 22 in the first predetermined plane by using the angular velocity information and the imaging element-position information. Then, the CPU 74 outputs the calculated imaging element-destination information to the BIS drive unit 80. The BIS drive unit 80 performs the BIS processing on the basis of the imaging element-destination information that is input from the CPU 74. That is, the BIS drive unit 80 moves the imaging element 22 to a destination, which is represented by the imaging element-destination information input from the CPU 74, in the first predetermined plane.

In a case where the mount 15 is connected to the mount 13, the external I/F 72 is connected to the control device 40 of the imaging lens 14 and takes charge of the transmission and reception of various kinds of information between the CPU 74 and the control device 40.

Figure 4:
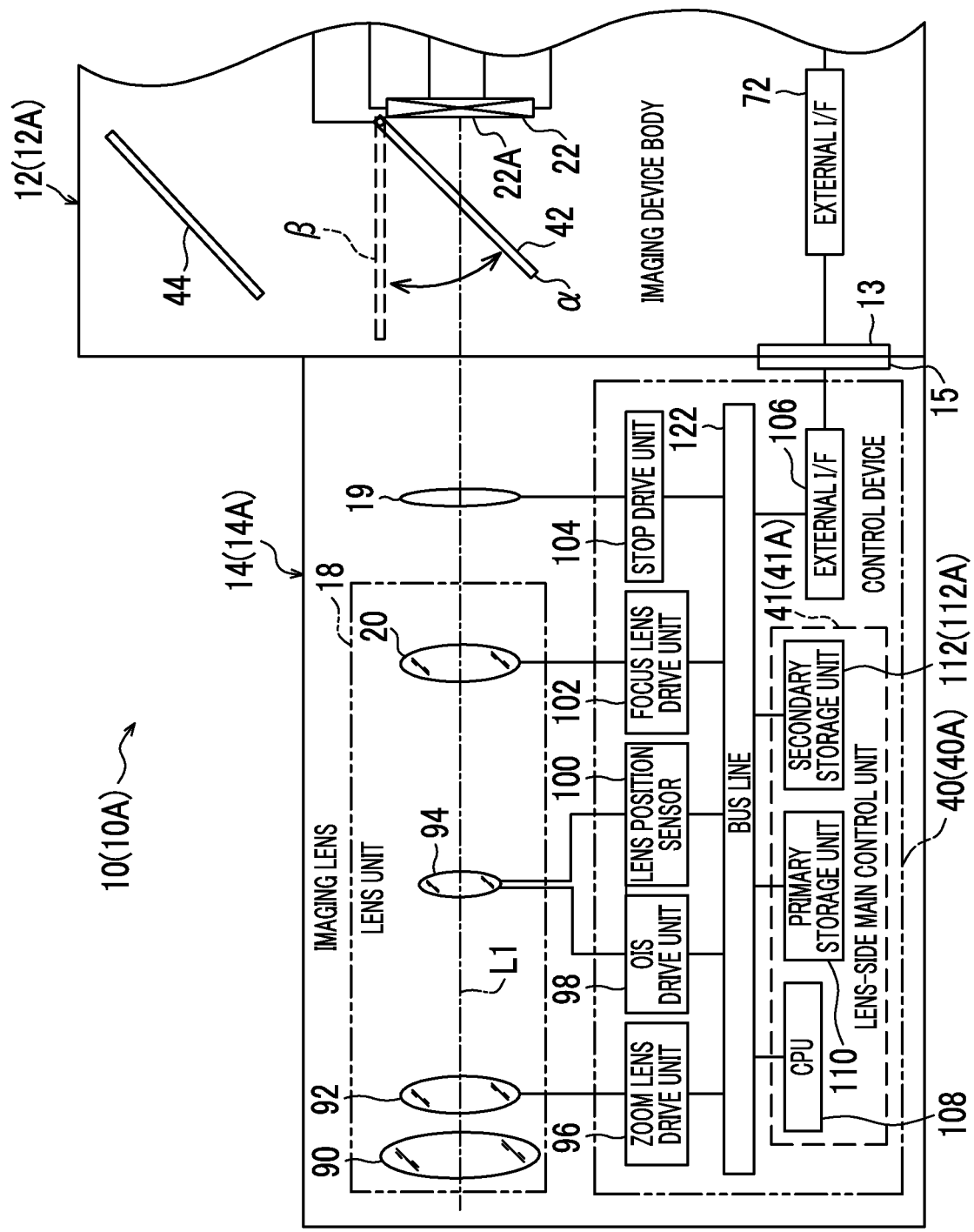
FIG. 4 is a block diagram showing an example of the hardware configuration of imaging lenses that are included in the imaging devices according to the first and second embodiments.

As shown in, for example, FIG. 4, the lens unit 18 includes an incident lens 90, a zoom lens 92, an anti-vibration lens 94, and a focus lens 20. The incident lens 90, the zoom lens 92, the anti-vibration lens 94, and the focus lens 20 are arranged along the optical axis L1; and the focus lens 20, the anti-vibration lens 94, the zoom lens 92, and the incident lens 90 are arranged along the optical axis L1 in this order from the stop 19.

Subject light is incident on the incident lens 90. The incident lens 90 transmits the subject light and guides the subject light to the zoom lens 92. The zoom lens 92 is a lens, which is movable along the optical axis L1, and is moved along the optical axis L1 to change the magnification of a subject image. The zoom lens 92 transmits the subject light, which is incident from the incident lens 90, and guides the subject light to the anti-vibration lens 94.

The anti-vibration lens 94 is a lens, which is movable in a direction where image blur is to be offset (for example, a direction perpendicular to the optical axis L1), and transmits the subject light, which is incident from the zoom lens 92, and guides the subject light to the focus lens 20.

The focus lens 20 is a lens, which is movable along the optical axis L1, and is moved along the optical axis L1 to change the focus state of a subject image that is formed on the light-receiving surface 22A of the imaging element 22. The focus lens 20 transmits the subject light, which is incident from the anti-vibration lens 94, and guides the subject light to the stop 19. The stop 19 adjusts the amount of the subject light that is incident from the anti-vibration lens 94, transmits the subject light, and guides the subject light to the imaging device body 12.

The control device 40 includes a lens-side main control unit 41, a zoom lens drive unit 96, an OIS drive unit 98, a lens position sensor 100, a focus lens drive unit 102, a stop drive unit 104, and an external I/F 106.

The lens-side main control unit 41 comprises a CPU 108, a primary storage unit 110, and a secondary storage unit 112. The CPU 108 controls the entire imaging lens 14. The primary storage unit 110 is a volatile memory that is used as a work area and the like at the time of execution of various programs. Examples of the primary storage unit 110 include a RAM. The secondary storage unit 112 is a non-volatile memory that stores various programs, various parameters, and the like in advance. Examples of the secondary storage unit 112 include an EEPROM, a flash memory, and the like.

The CPU 108, the primary storage unit 110, and the secondary storage unit 112 are connected to a bus line 122. Further, the zoom lens drive unit 96, the OIS drive unit 98, the lens position sensor 100, the focus lens drive unit 102, the stop drive unit 104, and the external I/F 106 are also connected to the bus line 122.

In a case where the mount 15 is connected to the mount 13, the external I/F 106 is connected to the external I/F 72 of the imaging device body 12 and takes charge of the transmission and reception of various kinds of information between the CPU 108 and the CPU 74 of the imaging device body 12 in cooperation with the external I/F 72.

The zoom lens drive unit 96 includes a zoom lens-driving motor (not shown), and moves the zoom lens 92 along the optical axis L1 by operating the zoom lens-driving motor under the control of the CPU 108 according to an instruction that is received by the receiving device 62. That is, the zoom lens drive unit 96 moves the zoom lens 92 along the optical axis L1 by operating the zoom lens-driving motor according to an instruction from the CPU 108 to transmit the power of the zoom lens-driving motor to the zoom lens 92.

The OIS drive unit 98 includes a driving source (not shown) for an anti-vibration lens that generates power to be applied to the anti-vibration lens 94. Examples of the driving source for an anti-vibration lens include a magnet and a flat coil. The OIS drive unit 98 suppresses the non-rotation influence by moving the anti-vibration lens 94 straight in a second predetermined plane under the control of the CPU 108 on the basis of the detection results of the gyro sensor 70. Here, "in a second predetermined plane" refers to, for example, "in a two-dimensional plane" perpendicular to the optical axis L1 in a state where vibration is not applied to the imaging device 10.

The anti-vibration lens 94 and the OIS drive unit 98 are an example of a lens-side suppression unit according to the technique of the disclosure. Further, for the convenience of description, processing for suppressing the non-rotation influence by the OIS drive unit 98 will be referred to as "OIS processing" in the following description. Furthermore, for the convenience of description, the BIS processing and the OIS processing will be referred to as "influence-suppression processing" in the following description in a case where the BIS processing and the OIS processing do not need to be described while being distinguished from each other.

The lens position sensor 100 includes, for example, a magnet and a hall element, and detects the position of the anti-vibration lens 94 in the second predetermined plane and outputs lens position information, which represents the detected position, to the CPU 108. The CPU 108 calculates lens destination information by using the lens position information and the angular velocity information that is acquired from the imaging device body 12 through the external I/F 106. The lens destination information refers to information that represents a destination where the non-rotation influence can be suppressed as the destination of the anti-vibration lens 94 in the OIS processing, that is, the destination of the anti-vibration lens 94 in the second predetermined plane. Then, the CPU 108 outputs the calculated lens destination information to the OIS drive unit 98. The OIS drive unit 98 moves the anti-vibration lens 94 to a destination that is represented by the lens destination information input from the CPU 108.

The focus lens drive unit 102 includes a focus lens-driving motor (not shown). The focus lens drive unit 102 moves the focus lens 20 along the optical axis L1 by operating the focus lens-driving motor under the control of the CPU 108 according to an instruction that is received by the receiving device 62. That is, the focus lens drive unit 102 moves the focus lens 20 along the optical axis L1 by operating the focus lens-driving motor according to an instruction from the CPU 108 to transmit the power of the focus lens-driving motor to the focus lens 20.

The stop drive unit 104 includes a stop-driving motor (not shown). The stop drive unit 104 adjusts the size of the aperture of the stop 19 by operating the stop-driving motor under the control of the CPU 108 according to an instruction that is received by the receiving device 62.

Figure 5:
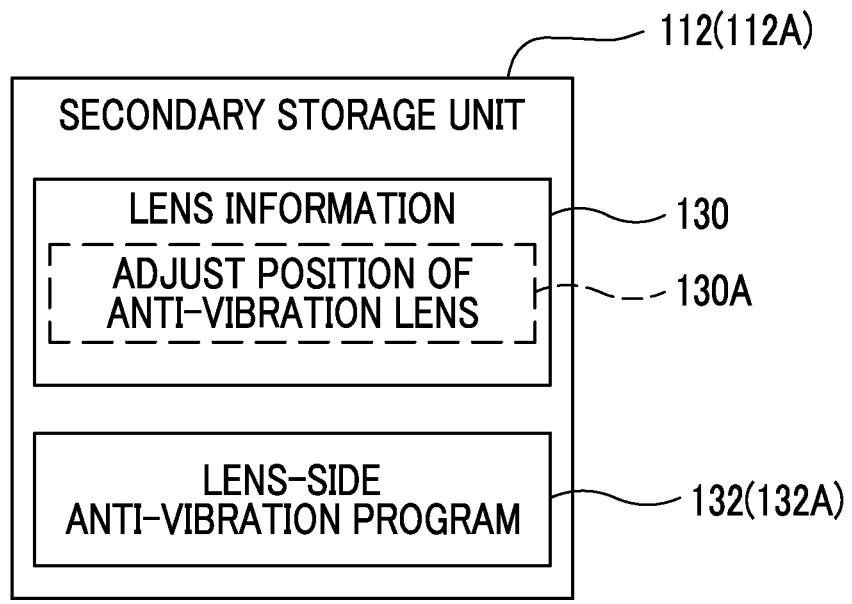
FIG. 5 is a conceptual diagram showing an example of contents stored in secondary storage units of lens-side main control units that are included in the imaging lenses of the imaging devices according to the first and second embodiments.

As shown in, for example, FIG. 5, the secondary storage unit 112 of the lens-side main control unit 41 stores lens information 130 and a lens-side anti-vibration program 132.

The lens information 130 is information relating to the characteristics of the imaging lens 14, and is transmitted to the CPU 74 of the imaging device body 12 from the CPU 108 in a case where the imaging lens 14 is connected to the imaging device body 12 through the mounts 13 and 15.

The lens information 130 includes lens-movable range information 130A. The lens-movable range information 130A is information that represents an anti-vibration lens-movable range. The anti-vibration lens-movable range is information that represents the maximum movable range of the anti-vibration lens 94 in the second predetermined plane. In the first embodiment, the movable range is synonymous with an allowed stroke.

Further, the lens information 130 also includes the focal length of the lens unit 18 (hereinafter, simply referred to as a "focal length"), lens position information, zoom lens position information, focus lens information, and the like. The zoom lens position information refers to information that represents the position of the zoom lens 92 on the optical axis L1. The focus lens information refers to information that represents the position of the focus lens 20 on the optical axis L1. Furthermore, the lens information 130 also includes physical quantities that represent the optical characteristics of the peripheral area of the lens unit 18.

Here, the amount of ambient light and the peripheral resolution of the lens unit 18 are employed as examples of the physical quantities representing the optical characteristics of the peripheral area of the lens unit 18, but the technique of the disclosure is not limited thereto. For example, the physical quantities representing the optical characteristics of the peripheral area of the lens unit 18 may be the amount of ambient light or the peripheral resolution of the lens unit 18.

The amount of ambient light of the lens unit 18 refers to the amount of light in the peripheral area of an image circle formed by the lens unit 18. The peripheral area of the image circle refers to an annular area of the image circle other than a circular area that has a radius corresponding to 80% of the radius of the image circle from the center of the image circle in a radial direction. Further, the peripheral resolution refers to a resolution that can be obtained from the amount of ambient light of the lens unit 18.

For the convenience of description, the amount of ambient light is expressed by a percentage as a ratio of the amount of ambient light to the amount of light at the center of the image circle in the following description in a case where the amount of light at the center of the image circle is assumed as 100%.

The CPU 108 reads the lens-side anti-vibration program 132 from the secondary storage unit 112, develops the lens-side anti-vibration program 132 in the primary storage unit 110, and performs lens-side anti-vibration processing (see FIG. 9) to be described later according to the developed lens-side anti-vibration program 132. In other words, the CPU 108 operates as a control unit according to the technique of the disclosure by executing the lens-side anti-vibration program 132.

Figure 6:
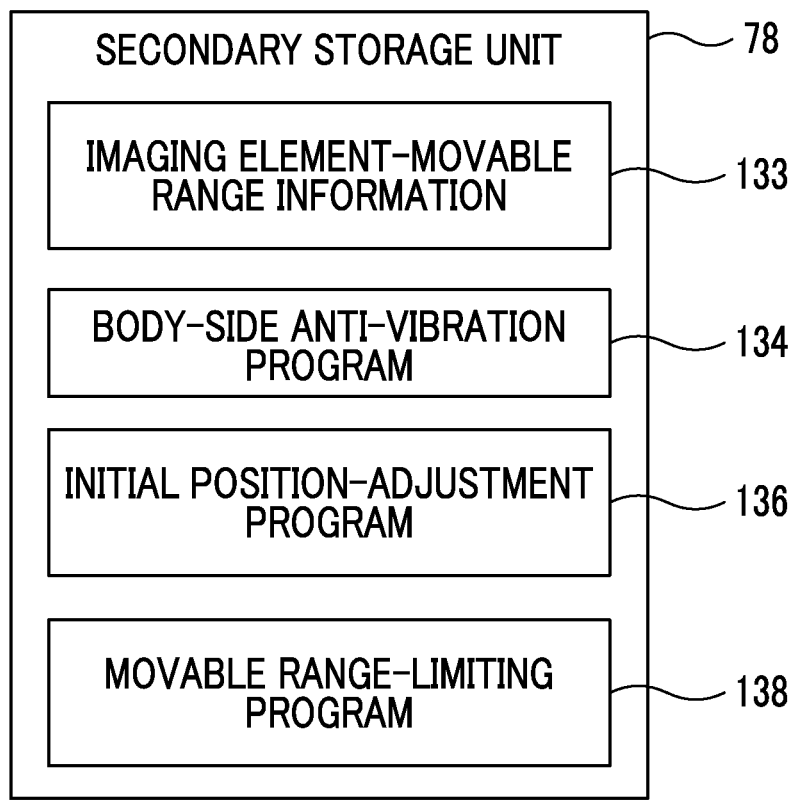
FIG. 6 is a conceptual diagram showing an example of contents stored in a secondary storage unit of a body-side main controller that is included in an imaging device body of the imaging device according to the first embodiment.

As shown in, for example, FIG. 6, the secondary storage unit 78 of the body-side main controller 46 stores imaging element-movable range information 133, a body-side anti-vibration program 134, an initial position-adjustment program 136, and a movable range-limiting program 138.

The imaging element-movable range information 133 is information that represents an imaging element-movable range. The imaging element-movable range refers to the maximum movable range of the imaging element 22 in the first predetermined plane.

The CPU 74 reads the body-side anti-vibration program 134 from the secondary storage unit 78, develops the body-side anti-vibration program 134 in the primary storage unit 76, and performs body-side anti-vibration processing (see FIG. 10) to be described later according to the developed body-side anti-vibration program 134.

The CPU 74 reads the initial position-adjustment program 136 from the secondary storage unit 78, develops the initial position-adjustment program 136 in the primary storage unit 76, and performs initial position-adjustment processing (see FIG. 11) to be described later according to the developed initial position-adjustment program 136. In other words, the CPU 74 operates as a control unit according to the technique of the disclosure by executing the initial position-adjustment program 136.

The CPU 74 reads the movable range-limiting program 138 from the secondary storage unit 78, develops the movable range-limiting program 138 in the primary storage unit 76, and performs movable range-limiting processing (see FIG. 8) to be described later according to the developed movable range-limiting program 138. In other words, the CPU 74 operates as a control unit according to the technique of the disclosure by executing the movable range-limiting program 138.

Accordingly, the CPU 74 performs control on the OIS drive unit 98 to limit the movable range of the anti-vibration lens 94 by the OIS drive unit 98 on the basis of the amount of the maximum shift in the angle of view (hereinafter, referred to as an "imaging element-side maximum shift amount") that is caused by the movement of the imaging element 22 moved by the BIS drive unit 80.

Further, in a case where the imaging element-side maximum shift amount is smaller than a lens-side maximum shift amount, the CPU 74 performs control on the OIS drive unit 98 to suppress a blurring influence by moving the anti-vibration lens 94 in a limited movable range during the display of a live view image. Here, the lens-side maximum shift amount refers to the amount of the maximum shift in the angle of view that is caused by the movement of the anti-vibration lens 94 in the OIS processing. Furthermore, here, the limited movable range refers to a movable range that is limited to be equal to or narrower than the imaging element-movable range represented by the imaging element-movable range information 133. The live view image is an example of a video according to the technique of the disclosure.

Moreover, the CPU 74 performs control on the OIS drive unit 98 to center the anti-vibration lens 94 in the limited movable range by the time when a main exposure-start condition, which is a condition where the imaging element 22 is to be caused to start main exposure, is satisfied and main exposure is started. Examples of the main exposure-start condition will be described later.

Next, operations, which have been already known in the related art and relate to the centering of the anti-vibration lens 94 and the adjustment of the position of the imaging element 22 to be performed between the start of the display of a live view image and the start of main exposure in a case where the imaging device 10 is in the imaging mode, will be described. "Centering" about the anti-vibration lens 94 refers to an operation for returning the anti-vibration lens 94 to a reference position that is a home position. Here, "reference position" refers to the position of the anti-vibration lens 94 in a state where vibration is not applied to the imaging device 10.

In a case where the operating mode of the imaging device 10 is set to the imaging mode, an image obtained from imaging is displayed on the display 28 as a live view image and the OIS processing starts to be performed by the OIS drive unit 98. In this case, a live view image is displayed on the display 28 in a state where image blur is suppressed as shown in, for example, FIG. 7.

Figure 7:
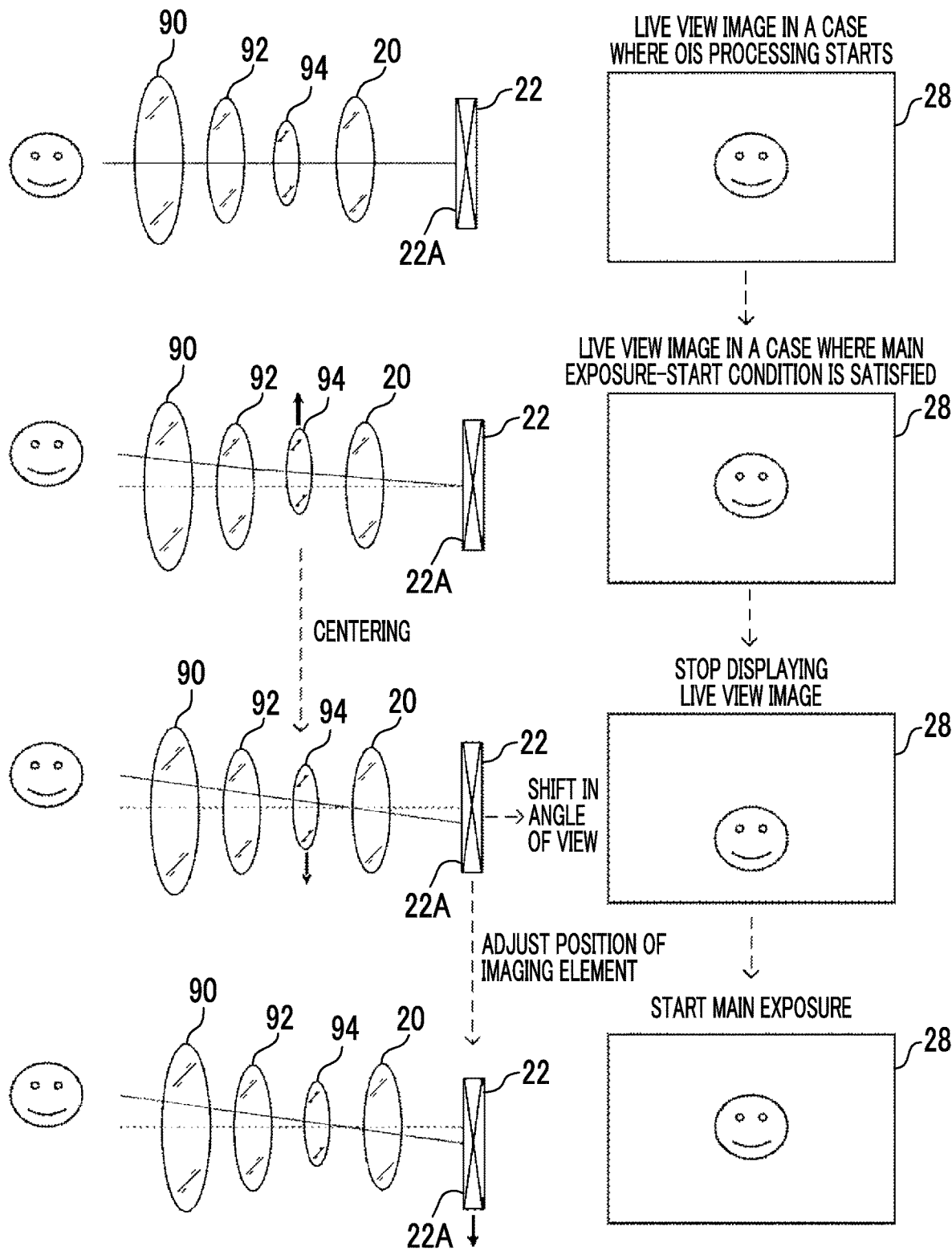
FIG. 7 is a state transition diagram that is provided for the description of a principle of the suppression of a shift in the angle of view by the time when main exposure is started after a live view image starts to be displayed.

Since OIS processing is performed by the OIS drive unit 98 even in a case where the main exposure-start condition is satisfied, a live view image is displayed on the display 28 in a state where image blur is suppressed as shown in, for example, FIG. 7. A condition where the release button 26 is pressed down to the final pressed-down position is used as one example of the main exposure-start condition. Further, a condition where the release button 26 is pressed down to the intermediate position is used as another example of the main exposure-start condition. Furthermore, a condition where at least one of a condition where an exposure state starts to be set by an AE function or a condition where focusing control is started by an AF function is satisfied is used as another example of the main exposure-start condition.

Incidentally, since subject light is refracted in a case where the anti-vibration lens 94 is moved, aberration in a case where the anti-vibration lens 94 is disposed at the reference position is different from aberration in a case where the anti-vibration lens 94 is disposed at a position away from the reference position. As a result, there is a concern that the quality of an image obtained from the imaging of a subject performed by the imaging device 10 (hereinafter, simply referred to as "image quality") may deteriorate.

Accordingly, in a case where the main exposure-start condition is satisfied, the CPU 74 causes the display 28 to stop displaying a live view image and causes the OIS drive unit 98 to center the anti-vibration lens 94.

Since the anti-vibration lens 94 has been returned to the reference position at the time when main exposure is to be started in a case where the anti-vibration lens 94 is centered in this way, the deterioration of image quality can be suppressed.

However, in a case where the anti-vibration lens 94 is centered as shown in, for example, FIG. 7, a shift in the angle of view occurs between an image that is obtained from imaging in a case where the anti-vibration lens 94 is centered and an image that is obtained from main exposure.

Accordingly, as shown in, for example, FIG. 7, the CPU 74 causes the BIS drive unit 80 to move the imaging element 22 to a position where a shift in the angle of view caused by the centering of the anti-vibration lens 94 is cancelled in the first predetermined plane. Then, the CPU 74 controls the imaging element driver 50 after the movement of the imaging element 22 to cause the imaging element 22 to start main exposure.

Here, a relationship between the stroke length of the anti-vibration lens 94 and the amount of shift in the angle of view will be described. The amount of shift in the angle of view refers to the amount of shift in the angle of view on the light-receiving surface 22A of the imaging element 22.

The stroke length (millimeter) of the anti-vibration lens 94 and the amount of shift in the angle of view (millimeter) are basically proportional to each other so as to be expressed in the following equation (1). In Equation (1), "Z" denotes the amount of shift in the angle of view, "LS" denotes the stroke length of the anti-vibration lens 94, and "K" denotes a proportional constant.

$$Z = K \times LS \qquad (1)$$

For example, in a case where K is 1 and the anti-vibration lens 94 is moved by 1 millimeter, the amount of shift in the angle of view is 1 millimeter. In this case, an imaging element-movable range CFS may satisfy a magnitude relationship expressed by the following equation (2) to cancel a shift in the angle of view caused by the centering of the anti-vibration lens 94 in a case where the anti-vibration lens 94 is moved by "LS" for the centering of the anti-vibration lens 94. The imaging element-movable range CFS is synonymous with the full stroke of the imaging element 22 in the first predetermined plane.

$$CFSZ = K \times LS \qquad (2)$$

Accordingly, to cancel a shift in the angle of view that occurs in a case where the anti-vibration lens 94 is moved by "LS" for the centering of the anti-vibration lens 94, the imaging element 22 may be moved to a position where a shift in the angle of view is cancelled in the imaging element-movable range CFS satisfying Equation (2) in the first predetermined plane.

Incidentally, in a case where the imaging lens 14 is interchanged, a difference may occur between the full stroke of the anti-vibration lens 94 in the second predetermined plane and the full stroke of the imaging element 22 in the first predetermined plane. The reason for this is that the full stroke of the anti-vibration lens 94 in the second predetermined plane varies depending on the type of the imaging lens 14. This means that there is a possibility that a difference also occurs between the amount of shift in the angle of view caused by the movement of the anti-vibration lens 94 and the amount of shift in the angle of view caused by the movement of the imaging element 22.

In a case where a difference also occurs between the amount of shift in the angle of view caused by the movement of the anti-vibration lens 94 and the amount of shift in the angle of view caused by the movement of the imaging element 22 in this way, a shift in the angle of view caused by the centering of the anti-vibration lens 94 may not be cancelled by the movement of the imaging element 22.

Accordingly, movable range-limiting processing shown in FIG. 8, lens-side anti-vibration processing shown in FIG. 9, body-side anti-vibration processing shown in FIG. 10, and initial position-adjustment processing shown in FIG. 11 will be described next as the actions of parts of the imaging device 10 according to the technique of the disclosure.

Here, the movable range-limiting processing, which is performed by the CPU 74 in a case where the power supply of the imaging device 10 is turned on (power is supplied to the imaging device 10) in a state where the imaging lens 14 is connected to the imaging device body 12 through the mounts 13 and 15, will be described first with reference to FIG. 8.

Figure 8:
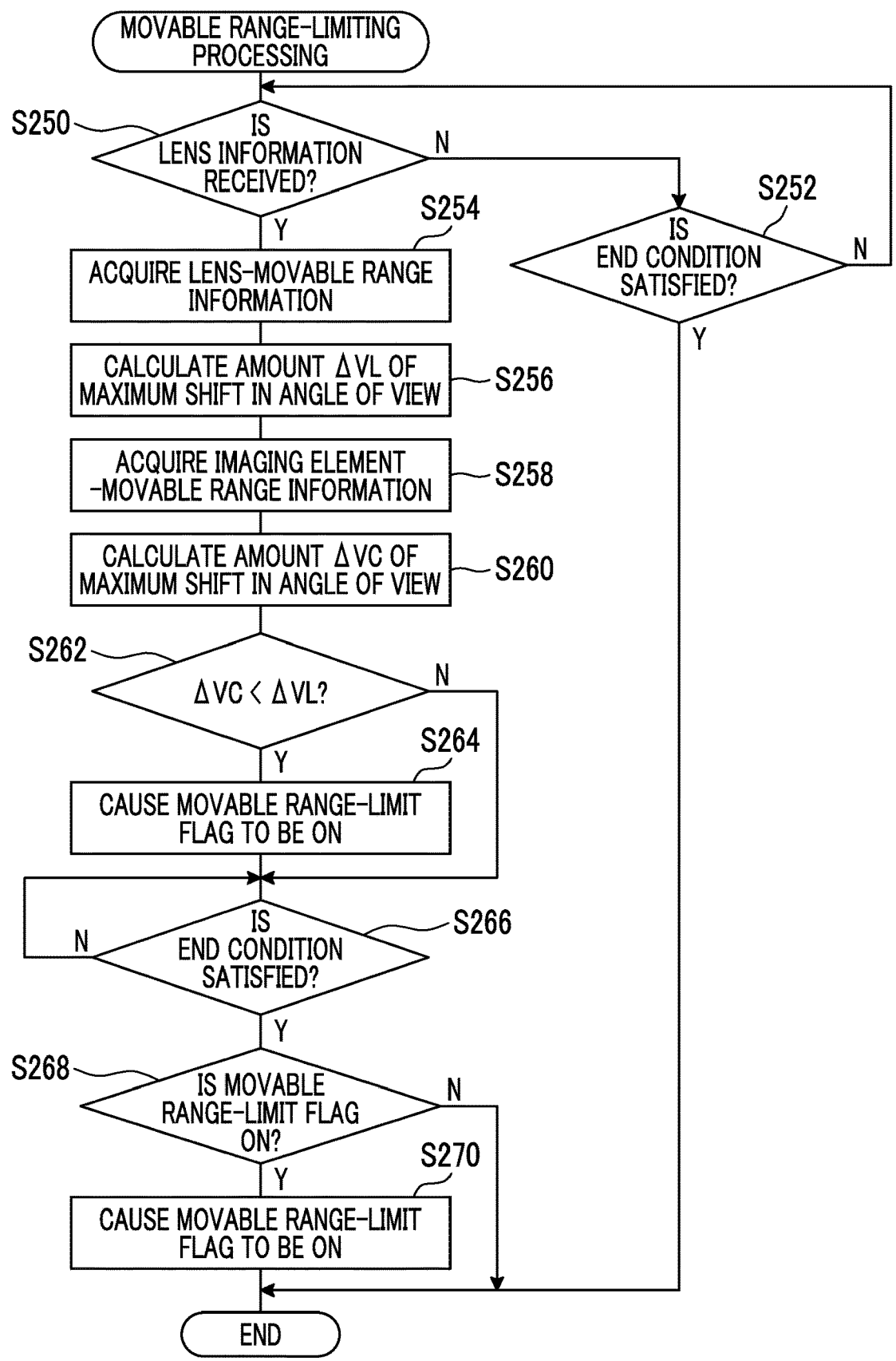
FIG. 8 is a flowchart showing an example of the flow of movable range-limiting processing according to the first embodiment.

In the movable range-limiting processing shown in FIG. 8, first, the CPU 74 determines in Step 250 whether or not the lens information 130 is received by the external I/F 72. In a case where the lens information 130 is not received by the external I/F 72 in Step 250, the determination is negative and the processing proceeds to Step 252. In a case where the lens information 130 is received by the external I/F 72 in Step 250, the determination is positive and the processing proceeds to Step 254.

In Step 252, the CPU 74 determines whether or not an end condition, which is a condition where the movable range-limiting processing is to end, is satisfied. A condition where an instruction to end the movable range-limiting processing is received by the receiving device 62 is used as one example of the end condition according to the movable range-limiting processing. Further, a condition where a first predetermined time (for example, 60 sec.) has passed while an instruction is not received by the receiving device 62 after the movable range-limiting processing starts to be performed is used as another example of the end condition according to the movable range-limiting processing.

In a case where the end condition according to the movable range-limiting processing is not satisfied in Step 252, the determination is negative and the processing proceeds to Step 250. In a case where the end condition according to the movable range-limiting processing is satisfied in Step 252, the determination is positive and the movable range-limiting processing ends.

The CPU 74 acquires the lens-movable range information 130A from the lens information 130, which is acquired in Step 250, in Step 254 and the processing then proceeds to Step 256.

The CPU 74 calculates the amount ΔVL of the maximum shift in the angle of view, which is an example of the lens-side maximum shift amount according to the technique of the disclosure, on the basis of the lens-movable range information 130A, which is acquired in Step 254, in Step 256 and the processing then proceeds to Step 258. The amount ΔVL of the maximum shift in the angle of view refers to the amount of the maximum shift in the angle of view that is caused by the movement of the anti-vibration lens 94 in the second predetermined plane. The amount ΔVL of the maximum shift in the angle of view is the amount of shift in the angle of view that corresponds to the anti-vibration lens-movable range represented by the lens-movable range information 130A.

In the first embodiment, the amount ΔVL of the maximum shift in the angle of view is calculated from an arithmetic equation for an anti-vibration lens that uses the anti-vibration lens-movable range as an independent variable and uses the amount of shift in the angle of view as a dependent variable. However, the technique of the disclosure is not limited thereto. For example, the amount ΔVL of the maximum shift in the angle of view may be derived from a table (not shown) for an anti-vibration lens in which the anti-vibration lens-movable range and the amount of shift in the angle of view are associated with each other.

The CPU 74 acquires the imaging element-movable range information 133 from the secondary storage unit 78 of the imaging device body 12 in Step 258, and the processing then proceeds to Step 260.

The CPU 74 calculates the amount ΔVC of the maximum shift in the angle of view, which is an example of the imaging element-side maximum shift amount according to the technique of the disclosure, on the basis of the imaging element-movable range information 133, which is acquired in Step 258, in Step 260 and the processing then proceeds to Step 262. The amount ΔVC of the maximum shift in the angle of view refers to the amount of the maximum shift in the angle of view that is caused by the movement of the imaging element 22 in the first predetermined plane. The amount ΔVC of the maximum shift in the angle of view is the amount of shift in the angle of view that corresponds to the imaging element-movable range represented by the imaging element-movable range information 133. For the convenience of description, the amount ΔVC of the maximum shift in the angle of view will also be referred to as an "imaging element-side maximum shift amount" in the following description.

In the first embodiment, the amount ΔVC of the maximum shift in the angle of view is calculated from an arithmetic equation for an imaging element that uses the imaging element-movable range as an independent variable and uses the amount of shift in the angle of view as a dependent variable. However, the technique of the disclosure is not limited thereto. For example, the amount ΔVC of the maximum shift in the angle of view may be derived from a table (not shown) for an imaging element in which the imaging element-movable range and the amount of shift in the angle of view are associated with each other.

In Step 262, the CPU 74 determines whether or not the amount ΔVC of the maximum shift in the angle of view calculated in Step 260 is smaller than the amount ΔVL of the maximum shift in the angle of view calculated in Step 256. In a case where the amount ΔVC of the maximum shift in the angle of view calculated in Step 260 is smaller than the amount ΔVL of the maximum shift in the angle of view calculated in Step 256 in Step 262, the determination is positive and the processing proceeds to Step 264. In a case where the amount ΔVC of the maximum shift in the angle of view calculated in Step 260 is equal to or larger than the amount ΔVL of the maximum shift in the angle of view calculated in Step 256 in Step 262, the determination is negative and the processing proceeds to Step 266.

The CPU 74 causes a movable range-limit flag to be on in Step 264, and the processing then proceeds to Step 266. Here, the movable range-limit flag refers to a flag representing that that movement of the anti-vibration lens 94 in the second predetermined plane is limited in a movable range corresponding to the imaging element-movable range. The movable range corresponding to the imaging element-movable range refers to, for example, the maximum stroke that is allowed as a stroke where the anti-vibration lens 94 is movable and is the same stroke as the maximum stroke allowed as a stroke where the imaging element 22 is movable. For the convenience of description, the maximum stroke allowed as a stroke where the anti-vibration lens 94 is movable will be referred to as "the maximum stroke of the anti-vibration lens 94" in the following description.

The maximum stroke of the anti-vibration lens 94 may not be the same stroke as the maximum stroke allowed as a stroke where the imaging element 22 is movable. For example, in a case where the full stroke of the anti-vibration lens 94 is denoted by "LFS" (millimeter) and a magnitude relationship of "CFS<K×LFS" is satisfied, the maximum stroke "$LS_{MAX}$" of the anti-vibration lens 94 may satisfy a magnitude relationship expressed by the following equation (3).

$$LS_{MAX} \leq CFS/K \qquad (3)$$

"K" is a parameter varying depending on the anti-vibration lens 94, and is changed according to a focal length f and the position p of the focus lens 20. Accordingly, the value of "K" depending on the anti-vibration lens 94 is prescribed by a numerical table corresponding to the focal length f and the position p, and the value of "K" may be derived from the numerical table. Further, the value of "K" may be prescribed as a function of K(f,p), and the value of "K" may be derived from the function of K(f,p).

In Step 266, the CPU 74 determines whether or not the end condition, which is a condition where the movable range-limiting processing is to end, is satisfied. In a case where the end condition according to the movable range-limiting processing is not satisfied in Step 266, the determination is negative and the determination of Step 266 is performed again. In a case where the end condition according to the movable range-limiting processing is satisfied in Step 266, the determination is positive and the processing proceeds to Step 268.

In Step 268, the CPU 74 determines whether or not the movable range-limit flag is on. In a case where the movable range-limit flag is on in Step 268, the determination is positive and the processing proceeds to Step 270. In a case where the movable range-limit flag is off in Step 268, the determination is negative and the movable range-limiting processing ends.

The CPU 74 causes the movable range-limit flag to be off in Step 270, and then ends the movable range-limiting processing.

Next, the lens-side anti-vibration processing, which is performed by the CPU 108 of the imaging lens 14 in a case where the power supply of the imaging device 10 is turned on (power is supplied to the imaging device 10) in a state where the imaging lens 14 is connected to the imaging device body 12 through the mounts 13 and 15, will be described with reference to FIG. 9.

Figure 9:
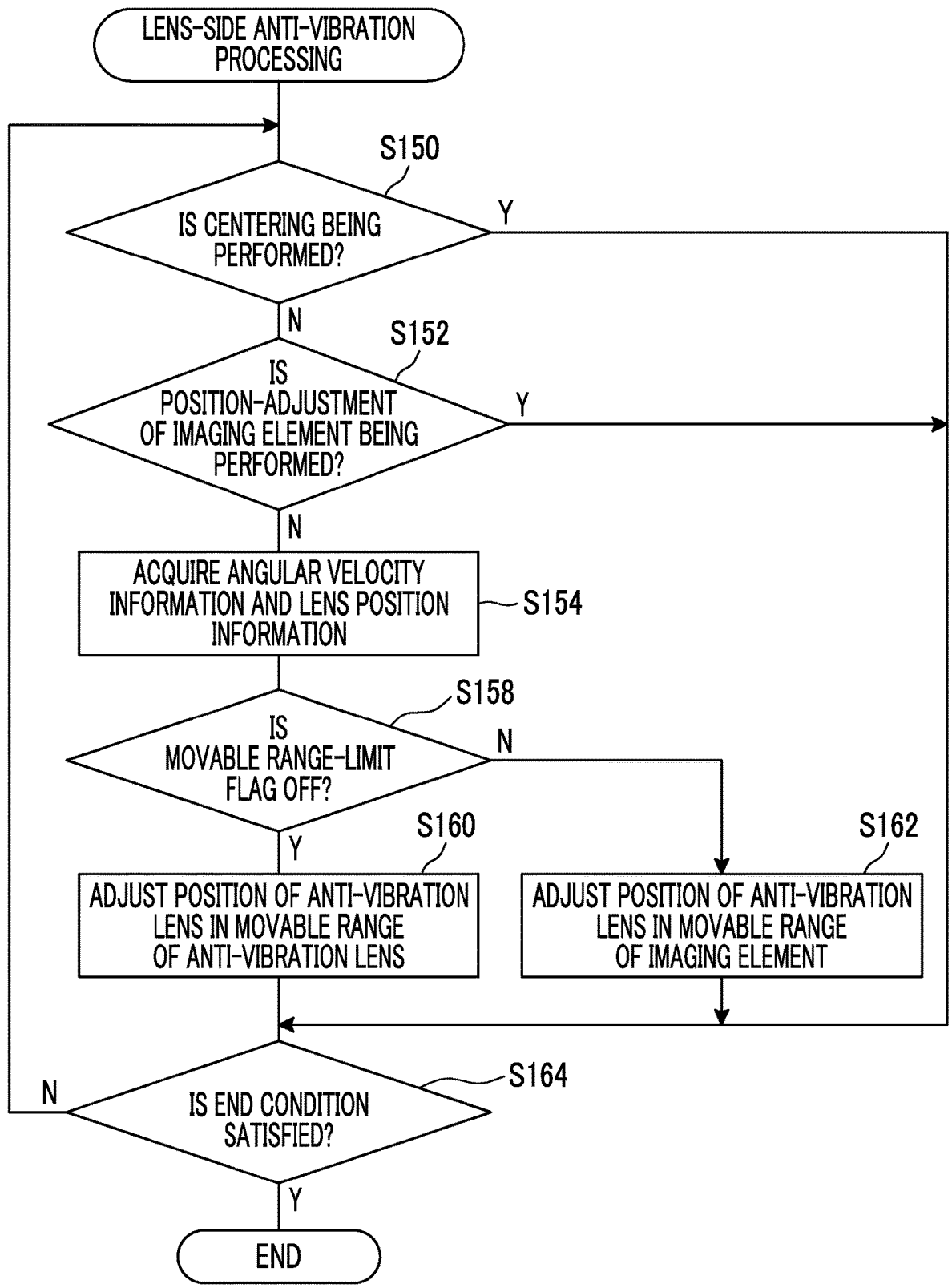
FIG. 9 is a flowchart showing an example of the flow of lens-side anti-vibration processing according to the first embodiment.
Figure 11:
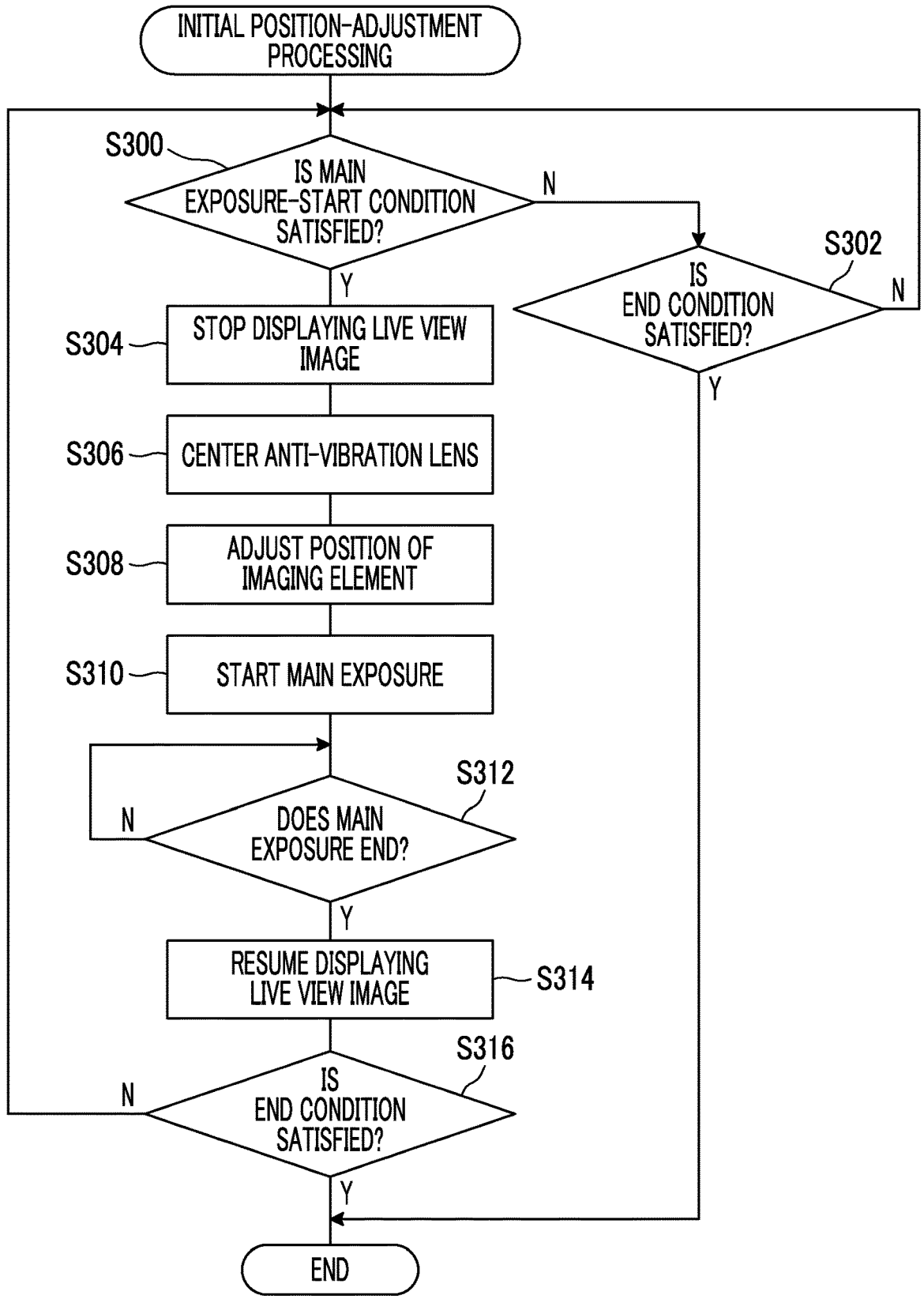
FIG. 11 is a flowchart showing an example of the flow of initial position-adjustment processing according to the first embodiment.

In the lens-side anti-vibration processing shown in FIG. 9, first, in Step 150, the CPU 108 determines whether or not the processing of Step 306 of the initial position-adjustment processing shown in FIG. 11 is being performed, that is, whether or not the anti-vibration lens 94 is being centered.

In a case where the processing of Step 306 of the initial position-adjustment processing shown in FIG. 11 is being performed in Step 150, the determination is positive and the processing proceeds to Step 164. In a case where the processing of Step 306 of the initial position-adjustment processing shown in FIG. 11 is not being performed in Step 150, the determination is negative and the processing proceeds to Step 152.

In Step 152, the CPU 108 determines whether or not the processing of Step 308 of the initial position-adjustment processing shown in FIG. 11 is being performed, that is, whether or not the position of the imaging element 22 is being adjusted. In a case where the processing of Step 308 of the initial position-adjustment processing shown in FIG. 11 is being performed in Step 152, the determination is positive and the processing proceeds to Step 164. In a case where the processing of Step 308 of the initial position-adjustment processing shown in FIG. 11 is not being performed in Step 152, the determination is negative and the processing proceeds to Step 154.

The CPU 108 acquires angular velocity information from the gyro sensor 70 of the imaging device body 12 and acquires lens position information from the lens position sensor 100 in Step 154 and the processing then proceeds to Step 158.

In Step 158, the CPU 108 determines whether or not the movable range-limit flag is off.

In a case where the movable range-limit flag is off in Step 158, the determination is positive and the processing proceeds to Step 160. In a case where the movable range-limit flag is on in Step 158, the determination is negative and the processing proceeds to Step 162.

In Step 160, first, the CPU 108 calculates the lens destination information by using the angular velocity information and the lens position information that are acquired in Step 154. Next, the CPU 108 acquires the lens-movable range information 130A from the secondary storage unit 112. Then, the CPU 108 adjusts the position of the anti-vibration lens 94 by moving the anti-vibration lens 94 to a destination, which is represented by the lens destination information, in the anti-vibration lens-movable range that is represented by the lens-movable range information 130A in the second predetermined plane. In a case where the position of the anti-vibration lens 94 is adjusted in this way, image blur is suppressed. After the processing of Step 160 ends, the lens-side anti-vibration processing proceeds to Step 164 from Step 160.

In Step 162, first, the CPU 108 calculates the lens destination information by using the lens position information and the angular velocity information that are acquired in Step 154. Next, the CPU 108 acquires the imaging element-movable range information 133 from the secondary storage unit 78 of the imaging device body 12. Then, the CPU 108 adjusts the position of the anti-vibration lens 94 by moving the anti-vibration lens 94 to a destination, which is represented by the lens destination information, in the movable range corresponding to an imaging element-movable range that is represented by the imaging element-movable range information 133 in the second predetermined plane. In a case where the position of the anti-vibration lens 94 is adjusted in this way, image blur is suppressed. After the processing of Step 162 ends, the lens-side anti-vibration processing proceeds to Step 164 from Step 162.

In Step 164, the CPU 108 determines whether or not an end condition, which is a condition where the lens-side anti-vibration processing is to end, is satisfied. A condition where an instruction to end the lens-side anti-vibration processing is received by the receiving device 62 is used as one example of the end condition according to the lens-side anti-vibration processing. Further, a condition where a second predetermined time (for example, 60 sec.) has passed while an instruction is not received by the receiving device 62 after the lens-side anti-vibration processing starts to be performed is used as another example of the end condition according to the lens-side anti-vibration processing.

In a case where the end condition according to the lens-side anti-vibration processing is not satisfied in Step 164, the determination is negative and the processing proceeds to Step 150. In a case where the end condition according to the lens-side anti-vibration processing is satisfied in Step 164, the determination is positive and the lens-side anti-vibration processing ends.

Next, the body-side anti-vibration processing, which is performed by the CPU 74 of the imaging device body 12 in a case where the power supply of the imaging device 10 is turned on (power is supplied to the imaging device 10) in a state where the imaging lens 14 is connected to the imaging device body 12 through the mounts 13 and 15, will be described with reference to FIG. 10.

Figure 10:
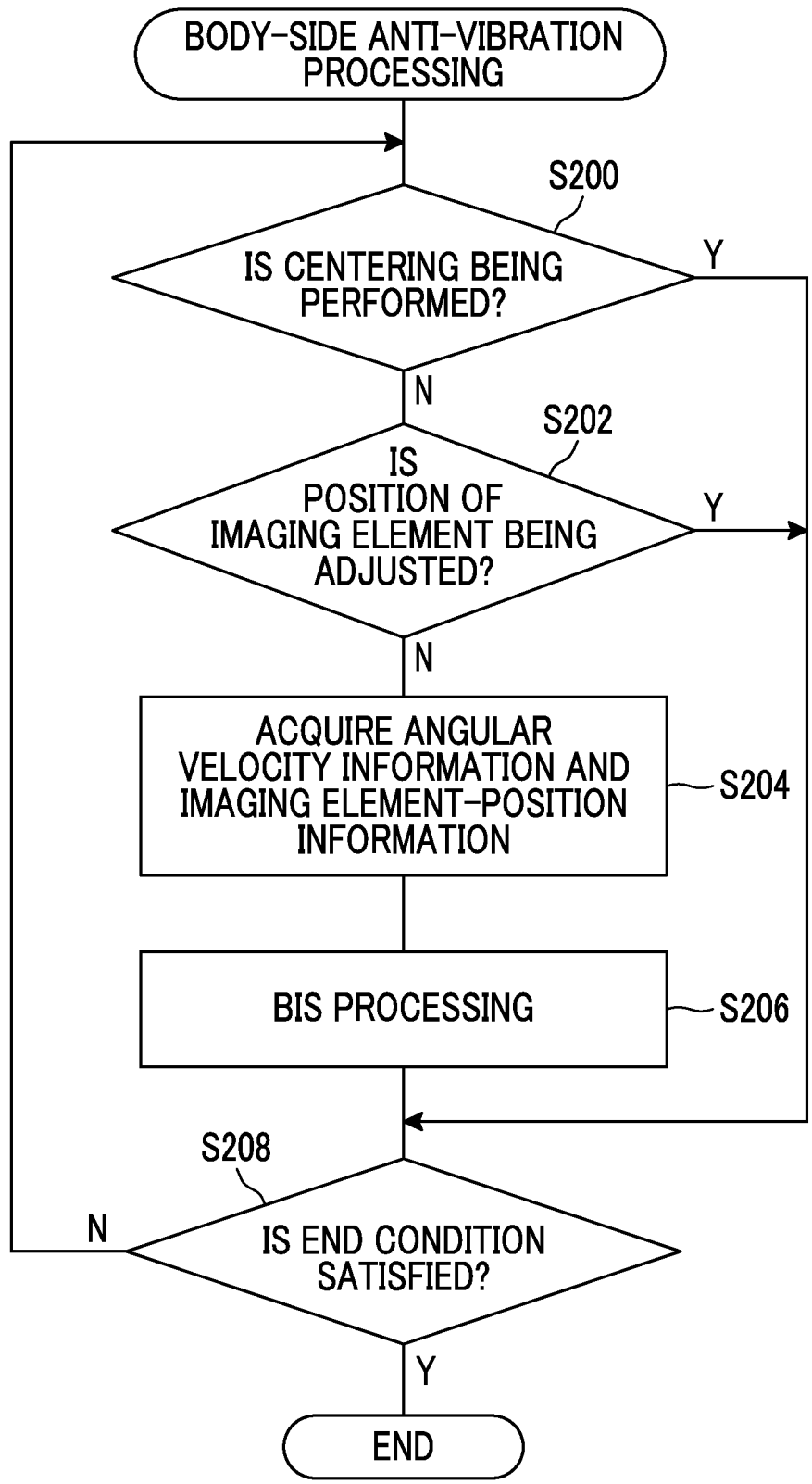
FIG. 10 is a flowchart showing an example of the flow of body-side anti-vibration processing according to the first embodiment.

In the body-side anti-vibration processing shown in FIG. 10, first, in Step 200, the CPU 74 determines whether or not the processing of Step 306 of the initial position-adjustment processing shown in FIG. 11 is being performed, that is, whether or not the anti-vibration lens 94 is being centered.

In a case where the processing of Step 306 of the initial position-adjustment processing shown in FIG. 11 is being performed in Step 200, the determination is positive and the processing proceeds to Step 208. In a case where the processing of Step 306 of the initial position-adjustment processing shown in FIG. 11 is not being performed in Step 200, the determination is negative and the processing proceeds to Step 202.

In Step 202, the CPU 74 determines whether or not the processing of Step 308 of the initial position-adjustment processing shown in FIG. 11 is being performed, that is, whether or not the position of the imaging element 22 is being adjusted. In a case where the processing of Step 308 of the initial position-adjustment processing shown in FIG. 11 is being performed in Step 202, the determination is positive and the processing proceeds to Step 208. In a case where the processing of Step 308 of the initial position-adjustment processing shown in FIG. 11 is not being performed in Step 202, the determination is negative and the processing proceeds to Step 204.

The CPU 74 acquires angular velocity information from the gyro sensor 70 and acquires imaging element-position information from the imaging element-position sensor 82 in Step 204, and the processing then proceeds to Step 206.

In Step 206, the CPU 74 causes the BIS drive unit 80 to perform the BIS processing on the basis of the angular velocity information and the imaging element-position information that are acquired in Step 204.

That is, in Step 206, first, the CPU 74 calculates imaging element-destination information by using the angular velocity information and the imaging element-position information that are acquired in Step 204. Next, the CPU 74 acquires the imaging element-movable range information 133 from the secondary storage unit 78. Then, the CPU 74 adjusts the position of the imaging element 22 by moving the imaging element 22 to a destination, which is represented by the imaging element-destination information, in an imaging element-movable range that is represented by the imaging element-movable range information 133 in the first predetermined plane. In a case where the position of the imaging element 22 is adjusted in this way, image blur is suppressed. After the processing of Step 206 ends, the body-side anti-vibration processing proceeds to Step 208 from Step 206.

In Step 208, the CPU 74 determines whether or not an end condition, which is a condition where the body-side anti-vibration processing is to end, is satisfied. A condition where an instruction to end the body-side anti-vibration processing is received by the receiving device 62 is used as one example of the end condition according to the body-side anti-vibration processing. Further, a condition where a third predetermined time (for example, 60 sec.) has passed while an instruction is not received by the receiving device 62 after the body-side anti-vibration processing starts to be performed is used as another example of the end condition according to the body-side anti-vibration processing.

In a case where the end condition according to the body-side anti-vibration processing is not satisfied in Step 208, the determination is negative and the processing proceeds to Step 200. In a case where the end condition according to the body-side anti-vibration processing is satisfied in Step 208, the determination is positive and the body-side anti-vibration processing ends.

Next, the initial position-adjustment processing, which is performed by the CPU 74 of the imaging device body 12 in a case where the power supply of the imaging device 10 is turned on (power is supplied to the imaging device 10) in a state where the imaging lens 14 is connected to the imaging device body 12 through the mounts 13 and 15, will be described with reference to FIG. 11.

For the convenience of description, description will be made here on the premise that the CPU 74 causes the display 28 to display a live view image. Further, for the convenience of description, description will be made here on the premise that an image showing a subject is displayed on the display 28 in a state where image blur is suppressed as shown in, for example, FIG. 7 since the CPU 74 causes the OIS drive unit 98 to perform the OIS processing.

In Step 300 shown in FIG. 11, the CPU 74 determines whether or not the main exposure-start condition is satisfied. In a case where the main exposure-start condition is satisfied in Step 300, the determination is positive and the processing proceeds to Step 304. In a case where the main exposure-start condition is not satisfied in Step 300, the determination is negative and the processing proceeds to Step 302.

As shown in, for example, FIG. 7, a live view image, which is obtained in a case where the main exposure-start condition is satisfied, is displayed on the display 28 in a state where image blur is suppressed by the OIS processing.

In Step 302, the CPU 74 determines whether or not an end condition, which is a condition where the initial position-adjustment processing is to end, is satisfied. A condition where an instruction to end the initial position-adjustment processing is received by the receiving device 62 is used as one example of the end condition according to the initial position-adjustment processing. Further, a condition where a fourth predetermined time (for example, 60 sec.) has passed while an instruction is not received by the receiving device 62 after the initial position-adjustment processing starts to be performed is used as another example of the end condition according to the initial position-adjustment processing.

In a case where the end condition according to the initial position-adjustment processing is not satisfied in Step 302, the determination is negative and the processing proceeds to Step 300. In a case where the end condition according to the initial position-adjustment processing is satisfied in Step 302, the determination is positive and the initial position-adjustment processing ends.

The CPU 74 causes the display 28 to stop displaying a live view image in Step 304, and the processing then proceeds to Step 306.

The CPU 74 controls the OIS drive unit 98 through the CPU 108 to center the anti-vibration lens 94 in Step 306, and the processing then proceeds to Step 308.

In a case where the processing of Step 306 is performed in a state where the movable range-limit flag is on, the centering of the anti-vibration lens 94 in the second predetermined plane is performed in the movable range corresponding to the imaging element-movable range. Further, in a case where the processing of Step 306 is performed in a state where the movable range-limit flag is off, the centering of the anti-vibration lens 94 in the second predetermined plane is performed in the anti-vibration lens-movable range.

In Step 308, the CPU 74 controls the BIS drive unit 80 to move the imaging element 22 to a position where a shift in the angle of view caused by the centering of the anti-vibration lens 94 is cancelled in the first predetermined plane as shown in, for example, FIG. 7.

Next, the CPU 74 controls the imaging element driver 50 to cause the imaging element 22 to perform main exposure in Step 310, and the processing then proceeds to Step 312.

In Step 312, the CPU 74 determines whether or not the main exposure ends. In a case where the main exposure does not end in Step 312, the determination is negative and the determination of Step 312 is performed again. In a case where the main exposure ends in Step 312, the determination is positive and the processing proceeds to Step 314.

The CPU 74 causes the display 28 to resume displaying a live view image in Step 314, and the processing then proceeds to Step 316.

In Step 316, the CPU 74 determines whether or not the end condition according to the initial position-adjustment processing is satisfied. In a case where the end condition according to the initial position-adjustment processing is not satisfied in Step 316, the determination is negative and the processing proceeds to Step 300. In a case where the end condition according to the initial position-adjustment processing is satisfied in Step 316, the determination is positive and the initial position-adjustment processing ends.

As described above, control for limiting the movable range of the anti-vibration lens 94 by the OIS drive unit 98 is performed in the imaging device 10 by the CPUs 74 and 108 on the basis of the amount ΔVC of the maximum shift in the angle of view (see Step 264 of FIG. 8 and Step 162 of FIG. 9). Therefore, according to the imaging device 10, it is possible to achieve both the suppression of deterioration of image quality and the suppression of a shift in the angle of view.

Further, in a case where the amount ΔVC of the maximum shift in the angle of view is smaller than the amount ΔVL of the maximum shift in the angle of view (Step 262: Y), the anti-vibration lens 94 is moved in the imaging device 10 in the movable range corresponding to the imaging element-movable range by the OIS drive unit 98 during the display of a live view image (see Step 162 of FIG. 9). Therefore, according to the imaging device 10, it is possible to achieve both the suppression of deterioration of image quality and the suppression of a non-rotation influence during the display of a live view image.

Further, the maximum stroke $LS_{MAX}$ of the anti-vibration lens 94 is prescribed in the imaging device 10 so as to satisfy a magnitude relationship of "$LS_{MAX} \leq CFS/K$" by Equation (3). That is, the maximum stroke $LS_{MAX}$ of the anti-vibration lens 94 is determined on the basis of the imaging element-movable range CFS. Therefore, according to the imaging device 10, the maximum stroke $LS_{MAX}$ of the anti-vibration lens 94 can be accurately prescribed as compared to a case where the maximum stroke $LS_{MAX}$ of the anti-vibration lens 94 is prescribed without using the imaging element-movable range CFS.

Furthermore, since "K" included in "$LS_{MAX} CFS/K$" is a parameter varying depending on the anti-vibration lens 94, the value of "K" may be derived from a numerical table, which corresponds to the focal length f and the position p, or the function of K(f,p) for each anti-vibration lens 94. That is, the maximum stroke $LS_{MAX}$ of the anti-vibration lens 94 may be determined on the basis of the imaging element-movable range CFS and the focal length f.

In this case, according to the imaging device 10, the maximum stroke $LS_{MAX}$ of the anti-vibration lens 94 can be accurately prescribed as compared to a case where the maximum stroke $LS_{MAX}$ of the anti-vibration lens 94 is prescribed without using the imaging element-movable range CFS and the focal length f. Further, according to the imaging device 10, the maximum stroke $LS_{MAX}$ of the anti-vibration lens 94 can be accurately prescribed as compared to a case where the maximum stroke $LS_{MAX}$ of the anti-vibration lens 94 is prescribed without using the imaging element-movable range CFS, the focal length, and the position p.

Furthermore, in the imaging device 10, the anti-vibration lens 94 is centered in the movable range corresponding to the imaging element-movable range by the time when the main exposure-start condition is satisfied and main exposure is started (see Step 306 of FIG. 11). Therefore, according to the imaging device 10, a shift between the angle of view of a live view image and the angle of view of an image, which is obtained from main exposure, can be reduced as compared to a case where the anti-vibration lens 94 is centered in a movable range wider than the movable range corresponding to the imaging element-movable range.

A case where the movable range-limiting processing shown in FIG. 8 is performed regardless of the characteristics of the imaging lens 14 has been described in the first embodiment, but the technique of the disclosure is not limited thereto. For example, the movable range-limiting processing shown in FIG. 8 may be performed by the CPU 74 only in a case where the amount of ambient light of the lens unit 18 of the imaging lens 14 is smaller than a threshold value (for example, 40%).

Here, examples of the threshold value to be compared with the amount of ambient light of the lens unit 18 include the amount of ambient light that is derived in advance from a sensory test and/or a computer simulation, or the like as a lower limit of the amount of ambient light where the deterioration of image quality caused by peripheral optical characteristics is not perceived visually in a case where the OIS processing and the BIS processing are performed. Here, the peripheral optical characteristics refer to, for example, the amount of ambient light and/or vignetting. A peripheral resolution may be used instead of the amount of ambient light to determine whether or not the movable range-limiting processing shown in FIG. 8 is permitted to be performed. Further, information, which represents the amount of ambient light and/or the peripheral resolution, may be included in the lens information 130 in advance, and may be acquired by the CPU 74 in a case where the imaging lens 14 is mounted on the imaging device body 12.

In a case where the characteristics of the imaging lens 14 coincide with predetermined characteristics, the movable range-limiting processing shown in FIG. 8 may be performed in the imaging device 10 in this way by the CPU 74. Accordingly, it is possible to avoid unnecessarily performing the movable range-limiting processing shown in FIG. 8 as compared to a case where the movable range-limiting processing shown in FIG. 8 is performed regardless of the characteristics of the imaging lens 14.

Further, the flow of processing, which is performed while a state is changed to a state where main exposure is performed from a state where a live view image is displayed, has been described in the first embodiment by way of example, but the technique of the disclosure is not limited thereto. For example, the technique of the disclosure can be applied even while a state is changed to a state where main exposure is performed from a state where a subject image is visually recognized from the finder 36 by a user. In this case, it is possible to achieve both the suppression of deterioration of image quality and the suppression of a shift in the angle of view of the subject image visually recognized from the finder 36 and an image obtained from main exposure.

Examples of a main exposure-start condition in a case where a state is changed to a state where main exposure is performed from a state where a subject image is visually recognized from the finder 36 by a user include a condition where the first mirror 42 is moved to the light-receiving surface opening position β from the light-receiving surface covering position α.

Furthermore, the gyro sensor 70 has been exemplified in the first embodiment, but the technique of the disclosure is not limited thereto. An acceleration sensor may be used instead of the gyro sensor 70. Moreover, the gyro sensor 70 and an acceleration sensor may be used together. As described above, any sensor may be used as long as functioning as a detection unit for detecting vibration applied to the imaging device 10.

Second Embodiment

A case where the anti-vibration lens 94 is centered has been described in the first embodiment, but an example where both the suppression of deterioration of image quality and the suppression of a shift in the angle of view are achieved without the centering of the anti-vibration lens 94 will be described in a second embodiment. In the second embodiment, the same components as the components described in the first embodiment will be denoted by the same reference numerals as those of the first embodiment and the description thereof will be omitted.

As shown in, for example, FIGS. 1 to 4, an imaging device 10A according to the second embodiment is different from the imaging device 10 according to the first embodiment in that the imaging device 10A includes an imaging device body 12A instead of the imaging device body 12. Further, the imaging device 10A is different from the imaging device 10 according to the first embodiment in that the imaging device 10A includes an imaging lens 14A instead of the imaging lens 14.

As shown in, for example, FIG. 3, the imaging device body 12A is different from the imaging device body 12 in that the imaging device body 12A includes a body-side main controller 46A instead of the body-side main controller 46. The body-side main controller 46A is different from the body-side main controller 46 in that the body-side main controller 46A includes a secondary storage unit 78A instead of the secondary storage unit 78. Further, the imaging lens 14A is different from the imaging lens 14 in that the imaging lens 14A includes a control device 40A instead of the control device 40.

As shown in, for example, FIG. 4, the control device 40A is different from the control device 40 in that the control device 40A includes a lens-side main control unit 41A instead of the lens-side main control unit 41. The lens-side main control unit 41A is different from the lens-side main control unit 41 in that the lens-side main control unit 41A includes a secondary storage unit 112A instead of the secondary storage unit 112.

As shown in, for example, FIG. 5, the secondary storage unit 112A is different from the secondary storage unit 112 in that the secondary storage unit 112A stores a lens-side anti-vibration program 132A instead of the lens-side anti-vibration program 132. The CPU 108 reads the lens-side anti-vibration program 132A from the secondary storage unit 112A, develops the lens-side anti-vibration program 132A in the primary storage unit 110, and performs lens-side anti-vibration processing shown in FIG. 15 according to the developed lens-side anti-vibration program 132A. In other words, the CPU 108 operates as a control unit according to the technique of the disclosure by executing the lens-side anti-vibration program 132A.

Figure 12:
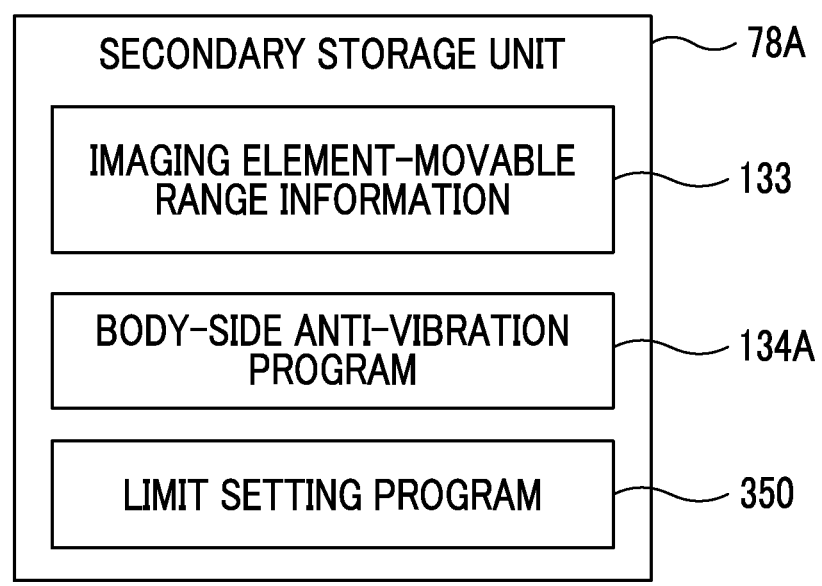
FIG. 12 is a conceptual diagram showing an example of contents stored in a secondary storage unit of a body-side main controller that is included in an imaging device body of the imaging device according to the second embodiment.

As shown in, for example, FIG. 12, the secondary storage unit 78A is different from the secondary storage unit 78 in that the secondary storage unit 78A stores a body-side anti-vibration program 134A instead of the body-side anti-vibration program 134. The CPU 74 reads the body-side anti-vibration program 134A from the secondary storage unit 78A, develops the body-side anti-vibration program 134A in the primary storage unit 76, and performs body-side anti-vibration processing shown in FIG. 16 according to the developed body-side anti-vibration program 134A.

Further, the secondary storage unit 78A is different from the secondary storage unit 78 in that the secondary storage unit 78A stores a limit setting program 350 instead of the initial position-adjustment program 136 and the movable range-limiting program 138. The CPU 74 reads the limit setting program 350 from the secondary storage unit 78A, develops the limit setting program 350 in the primary storage unit 76, and performs limit setting processing shown in FIGS. 13 and 14 according to the developed limit setting program 350. In other words, the CPU 74 operates as a control unit according to the technique of the disclosure by executing the limit setting program 350.

For the convenience of description, the imaging devices 10 and 10A will be referred to as "imaging devices" without being denoted by reference numerals in the following description in a case where the imaging devices 10 and 10A do not need to be described while being distinguished from each other. Further, for the convenience of description, the imaging device bodies 12 and 12A will be referred to as "imaging device bodies" without being denoted by reference numerals in the following description in a case where the imaging device bodies 12 and 12A do not need to be described while being distinguished from each other. Furthermore, for the convenience of description, the secondary storage units 78 and 78A will be referred to as "secondary storage units" without being denoted by reference numerals in the following description in a case where the secondary storage units 78 and 78A do not need to be described while being distinguished from each other. Moreover, for the convenience of description, the lens-side anti-vibration program 132, the body-side anti-vibration program 134, the initial position-adjustment program 136, and the movable range-limiting program 138 will be simply referred to as programs according to the first embodiment in the following description in a case where the lens-side anti-vibration program 132, the body-side anti-vibration program 134, the initial position-adjustment program 136, and the movable range-limiting program 138 are to be generically named without being distinguished from each other. Further, for the convenience of description, the lens-side anti-vibration program 132A, the body-side anti-vibration program 134A, and the limit setting program 350 will be simply referred to as programs according to the second embodiment in the following description in a case where the lens-side anti-vibration program 132A, the body-side anti-vibration program 134A, and the limit setting program 350 are to be generically named without being distinguished from each other. Furthermore, the programs according to the first embodiment and the programs according to the second embodiment will be referred to as "programs" in the following description in a case where the programs according to the first embodiment and the programs according to the second embodiment do not need to be described while being distinguished from each other.

Next, the limit setting processing shown in FIGS. 13 and 14, the lens-side anti-vibration processing shown in FIG. 15, and the body-side anti-vibration processing shown in FIG. 16 will be described as the actions of parts of the imaging device 10A according to the technique of the disclosure. The description of the same actions as the actions of the first embodiment will be omitted.

Figure 13:
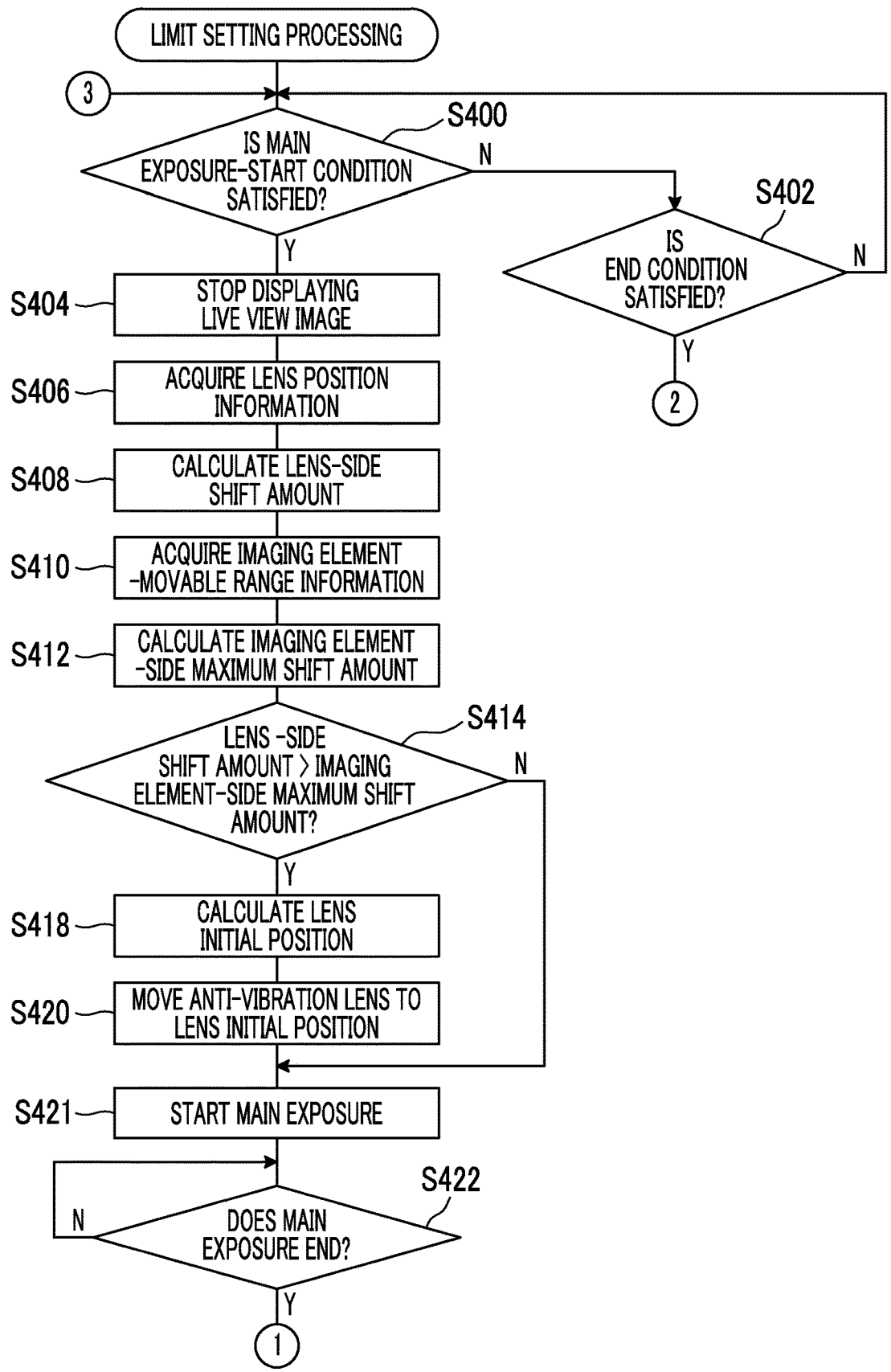
FIG. 13 is a flowchart showing an example of the flow of limit setting processing according to the second embodiment.
Figure 14:
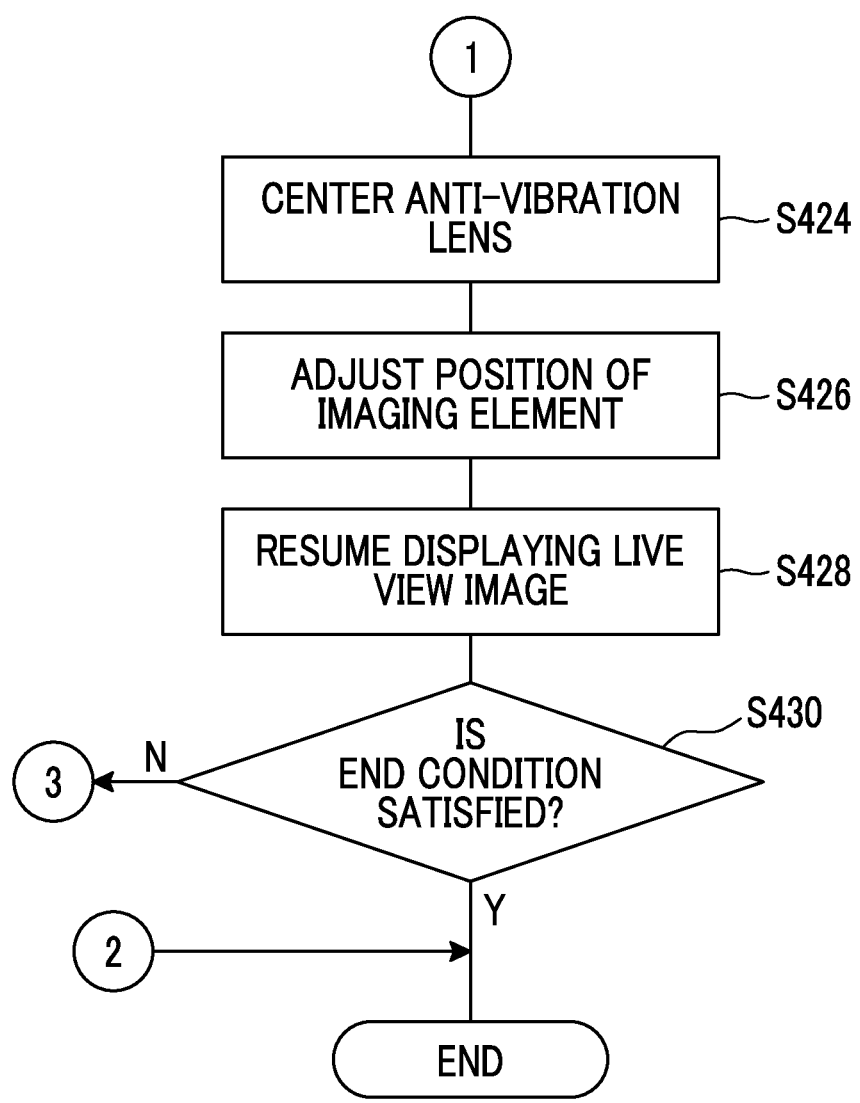
FIG. 14 is a continuation of the flowchart shown in FIG. 13.

The limit setting processing shown in FIGS. 13 and 14 is performed by the CPU 74 of the imaging device body 12A in a case where the power supply of the imaging device 10A is turned on (power is supplied to the imaging device 10A) in a state where the imaging lens 14 is connected to the imaging device body 12A through the mounts 13 and 15. For the convenience of description, description will be made here on the premise that the imaging device 10A is in the imaging mode and a live view image is displayed on the display 28.

In the limit setting processing shown in FIG. 13, first, in Step 400, the CPU 74 determines whether or not the main exposure-start condition is satisfied. In a case where the main exposure-start condition is satisfied in Step 400, the determination is positive and the processing proceeds to Step 404. In a case where the main exposure-start condition is not satisfied in Step 400, the determination is negative and the processing proceeds to Step 402.

In Step 402, the CPU 74 determines whether or not an end condition, which is a condition where the limit setting processing is to end, is satisfied. A condition where an instruction to end the limit setting processing is received by the receiving device 62 is used as one example of the end condition according to the limit setting processing. Further, a condition where a fifth predetermined time (for example, 60 sec.) has passed while an instruction is not received by the receiving device 62 after the limit setting processing starts to be performed is used as another example of the end condition according to the limit setting processing.

In a case where the end condition according to the limit setting processing is not satisfied in Step 402, the determination is negative and the processing proceeds to Step 400. In a case where the end condition according to the limit setting processing is satisfied in Step 402, the determination is positive and the limit setting processing ends.

The CPU 74 causes the display 28 to stop displaying a live view image in Step 404, and the processing then proceeds to Step 406.

The CPU 74 acquires lens position information from the lens position sensor 100 in Step 406, and the processing then proceeds to Step 408.

The CPU 74 calculates a lens-side shift amount on the basis of the lens position information, which is acquired in Step 406, in Step 408 and the processing then proceeds to Step 410.

Here, the lens-side shift amount refers to the amount of shift in the angle of view that is caused by the centering of the anti-vibration lens 94. In the second embodiment, the lens-side shift amount is calculated from a lens-side shift amount-arithmetic equation that uses the lens position information as an independent variable and uses the lens-side shift amount as a dependent variable. However, the technique of the disclosure is not limited thereto. For example, the lens-side shift amount may be derived from a lens-side shift amount table in which the lens position information and the lens-side shift amount are associated with each other.

The CPU 74 acquires the imaging element-movable range information 133 from the secondary storage unit 78A in Step 410, and the processing then proceeds to Step 412.

The CPU 74 calculates the imaging element-side maximum shift amount on the basis of the imaging element-movable range information 133, which is acquired in Step 410, in Step 412 and the processing then proceeds to Step 414.

In the second embodiment, the imaging element-side maximum shift amount is calculated from an imaging element-side maximum shift amount-arithmetic equation that uses the imaging element-movable range as an independent variable and uses the amount of shift in the angle of view corresponding to the imaging element-movable range as a dependent variable. However, the technique of the disclosure is not limited thereto. For example, the imaging element-side maximum shift amount may be derived from an imaging element-side maximum shift amount table in which the imaging element-movable range and the amount of shift in the angle of view are associated with each other.

In Step 414, the CPU 74 determines whether or not the lens-side shift amount calculated in Step 408 exceeds the imaging element-side maximum shift amount calculated in Step 412. In a case where the lens-side shift amount calculated in Step 408 exceeds the imaging element-side maximum shift amount calculated in Step 412 in Step 414, the determination is positive and the processing proceeds to Step 418. In a case where the lens-side shift amount calculated in Step 408 is equal to or smaller than the imaging element-side maximum shift amount calculated in Step 412 in Step 414, the determination is negative and the processing proceeds to Step 421.

The CPU 74 calculates a lens initial position on the basis of the lens position information, which is acquired in Step 406, and the imaging element-movable range information 133, which is acquired in Step 410, in Step 418 and the processing then proceeds to Step 420. The lens initial position is an example of an initial position according to the technique of the disclosure.

Here, the lens initial position refers to a position where the operation of the anti-vibration lens 94 required for the suppression of a non-rotation influence is started, that is, a position where the operation of the anti-vibration lens 94 is started by the OIS processing. Further, the lens initial position is determined according to the degree of difference between the lens-side shift amount and the imaging element-side maximum shift amount.

Examples of the lens initial position include a position where the anti-vibration lens 94 is moved in the direction of centering from the position of the anti-vibration lens 94, which is represented by the lens position information, by the imaging element-movable range that is represented by the imaging element-movable range information 133. In other words, a position where the anti-vibration lens 94 is moved toward the reference position of the anti-vibration lens 94 from the position of the anti-vibration lens 94, which is represented by the lens position information, by the imaging element-movable range, which is represented by the imaging element-movable range information 133, is the lens initial position. The reference position of the anti-vibration lens 94 is the limit of the destination of the anti-vibration lens 94.

Incidentally, a case where a shift in the angle of view caused by the centering of the anti-vibration lens 94 is not cancelled by the movement of the imaging element 22 is a case where coordinates representing the current position of the anti-vibration lens 94 in the second predetermined plane are denoted by (x1,y1) and a distance r1 between the reference position and the position of the anti-vibration lens 94 satisfies "CFS<K×r1=K×√(x1^ 2±y1^ 2)". In this case, in a case where the coordinates of the position of the destination of the anti-vibration lens 94 in the second predetermined plane, that is, the coordinates of the lens initial position are denoted by (x2,y2), the coordinates (x2,y2) are calculated by the following equation (4). "CFS/r1" of Equation (4) is an example of the degree of difference according to the technique of the disclosure.

$$(x2,y2)=(x1 \times CFS/r1, y1 \times CFS/r1) \tag{4}$$

Even in the second embodiment, as described in the first embodiment, "K" may be derived from the numerical table or the function of K(f,p) described in the first embodiment.

The CPU 74 moves the anti-vibration lens 94 to the lens initial position, which is calculated in Step 418, in Step 420 and the processing then proceeds to Step 421.

The CPU 74 controls the imaging element driver 50 to cause the imaging element 22 to start main exposure in Step 421, and the processing then proceeds to Step 422.

In Step 422, the CPU 74 determines whether or not the main exposure ends. In a case where the main exposure does not end in Step 422, the determination is negative and the determination of Step 422 is performed again. In a case where the main exposure ends in Step 422, the determination is positive and the processing proceeds to Step 424 shown in FIG. 14.

The CPU 74 controls the OIS drive unit 98 to center the anti-vibration lens 94 in Step 424, and the processing then proceeds to Step 426.

In Step 426, the CPU 74 controls the BIS drive unit 80 to move the imaging element 22 to a position where a shift in the angle of view caused by the centering of the anti-vibration lens 94 is cancelled in the first predetermined plane as shown in, for example, FIG. 7.

The CPU 74 causes the display 28 to resume displaying a live view image in the next step 428, and the processing then proceeds to Step 430.

In Step 430, the CPU 74 determines whether or not an end condition, which is a condition where the limit setting processing is to end, is satisfied. In a case where the end condition according to the limit setting processing is not satisfied in Step 430, the determination is negative and the processing proceeds to Step 400. In a case where the end condition according to the limit setting processing is satisfied in Step 430, the limit setting processing ends.

Next, the lens-side anti-vibration processing, which is performed by the CPU 108 of the imaging lens 14 in a case where the power supply of the imaging device 10A is turned on (power is supplied to the imaging device 10) in a state where the imaging lens 14 is connected to the imaging device body 12 through the mounts 13 and 15, will be described with reference to FIG. 15. In the following description, the same steps as the steps of the flowchart shown in FIG. 9 will be denoted by the same step numbers as those of the flowchart and the description thereof will be omitted.

Figure 15:
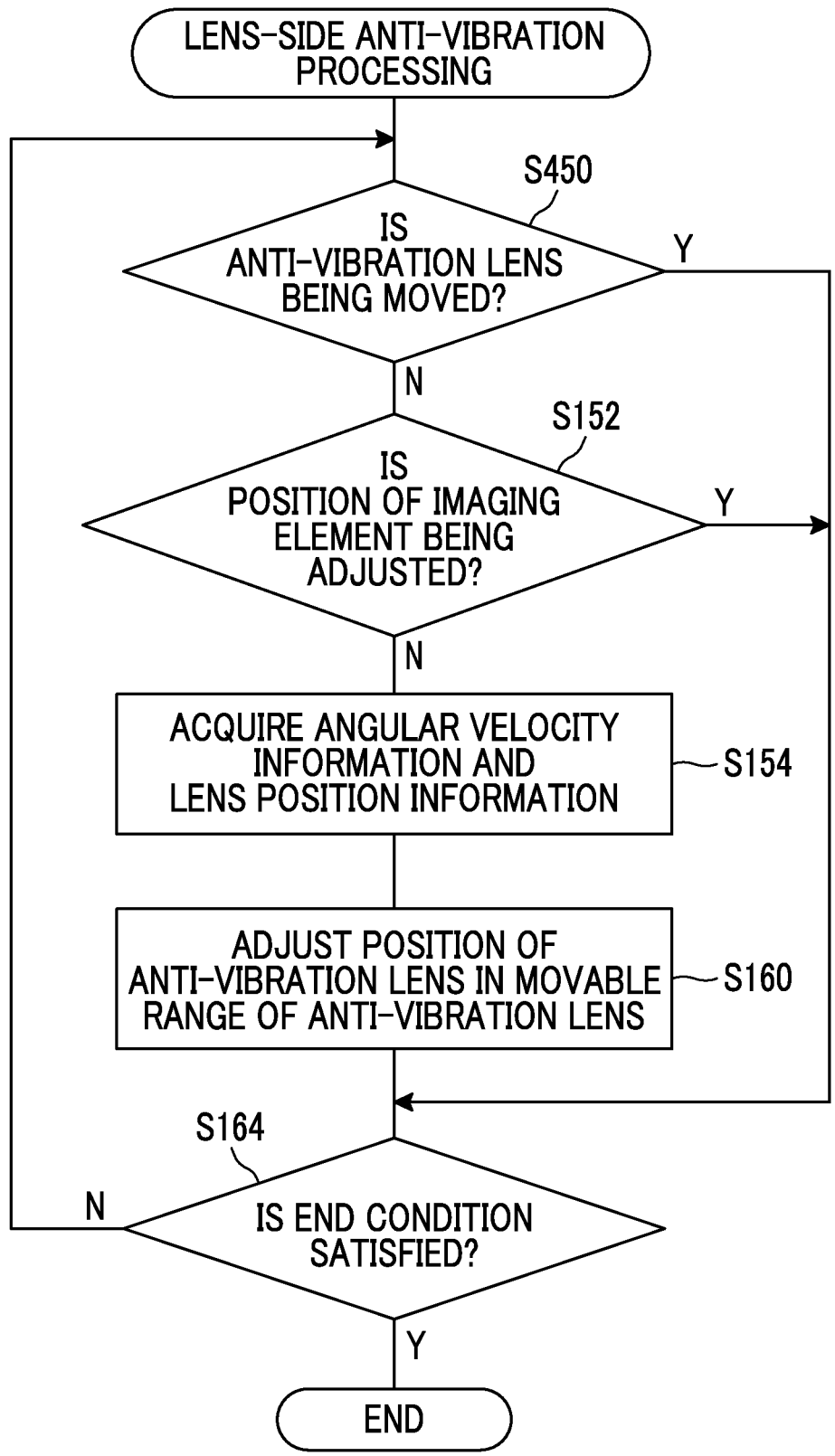
FIG. 15 is a flowchart showing an example of the flow of lens-side anti-vibration processing according to the second embodiment.

The lens-side anti-vibration processing shown in FIG. 15 is different from the lens-side anti-vibration processing shown in FIG. 9 in that the lens-side anti-vibration processing shown in FIG. 15 includes Step 450 instead of Step 150. Further, the lens-side anti-vibration processing shown in FIG. 15 is different from the lens-side anti-vibration processing shown in FIG. 9 in that the lens-side anti-vibration processing shown in FIG. 15 does not include Steps 158 and 162. Accordingly, the lens-side anti-vibration processing shown in FIG. 15 proceeds to Step 160 after the processing of Step 154 ends.

In Step 450, the CPU 108 determines whether or not the anti-vibration lens 94 is being moved. Here, "the anti-vibration lens 94 is being moved" means that the processing of Step 420 shown in FIG. 13 is being performed and the processing of Step 424 shown in FIG. 14 is performed. That is, "the processing of Step 420 shown in FIG. 13 is being performed" means that the anti-vibration lens 94 is being moved to the lens initial position, and "the processing of Step 424 shown in FIG. 14 is being performed" means that the anti-vibration lens 94 is being centered.

In a case where the anti-vibration lens 94 is being moved in Step 450, the determination is positive and the processing proceeds to Step 164. In a case where the anti-vibration lens 94 is not being moved in Step 450, the determination is negative and the processing proceeds to Step 152.

Next, the body-side anti-vibration processing, which is performed by the CPU 108 of the imaging lens 14 in a case where the power supply of the imaging device 10A is turned on (power is supplied to the imaging device 10) in a state where the imaging lens 14 is connected to the imaging device body 12 through the mounts 13 and 15, will be described with reference to FIG. 16. In the following description, the same steps as the steps of the flowchart shown in FIG. 10 will be denoted by the same step numbers as those of the flowchart and the description thereof will be omitted.

Figure 16:
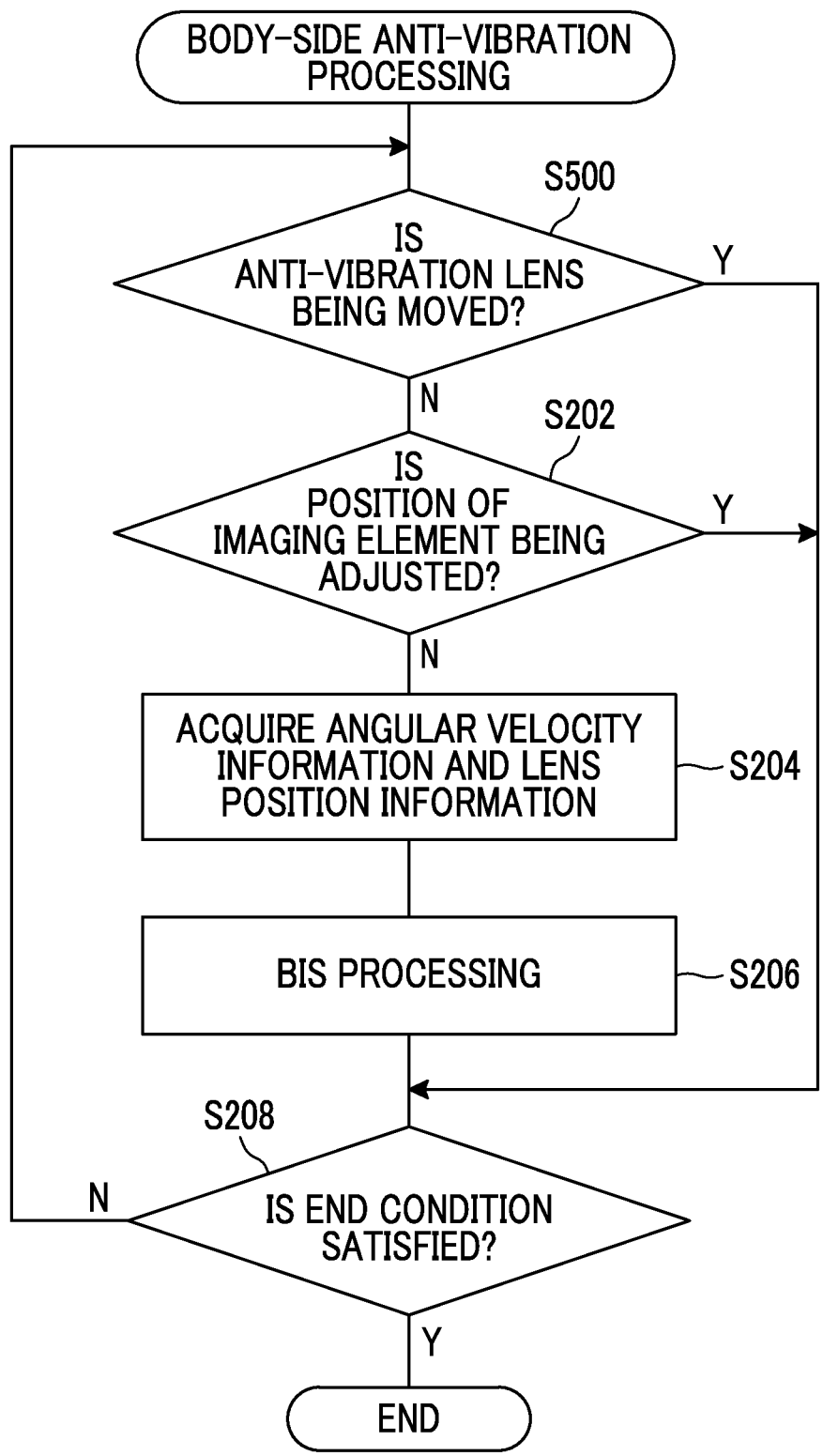
FIG. 16 is a flowchart showing an example of the flow of body-side anti-vibration processing according to the second embodiment.

The body-side anti-vibration processing shown in FIG. 16 is different from the body-side anti-vibration processing shown in FIG. 10 in that the body-side anti-vibration processing shown in FIG. 16 includes Step 500 instead of Step 200.

In Step 500, the CPU 108 determines whether or not the anti-vibration lens 94 is being moved. Here, "the anti-vibration lens 94 is being moved" means that the processing of Step 420 shown in FIG. 13 is being performed and the processing of Step 424 shown in FIG. 14 is performed as with Step 450 shown in FIG. 15.

In a case where the anti-vibration lens 94 is being moved in Step 500, the determination is positive and the processing proceeds to Step 208. In a case where the anti-vibration lens 94 is not being moved in Step 500, the determination is negative and the processing proceeds to Step 202.

As described above, the anti-vibration lens 94 is moved in the direction of centering (Step 420) in the imaging device 10A in a case where the lens-side shift amount exceeds the imaging element-side maximum shift amount by the time when the main exposure-start condition is satisfied (Step 400: Y) and main exposure is started (Step 421). Therefore, according to the imaging device 10A, a shift in the angle of view before and after main exposure can be suppressed as compared to a case where the anti-vibration lens 94 is not moved in the direction of centering.

Further, in the imaging device 10A, the lens initial position is determined according to the degree of difference between the lens-side shift amount and the imaging element-side maximum shift amount. Furthermore, in the imaging device 10A, the operation of the anti-vibration lens 94 required for the suppression of a non-rotation influence is performed in the anti-vibration lens-movable range after the anti-vibration lens 94 is moved to the lens initial position (see Step 160 of FIG. 15). Therefore, according to the imaging device 10A, the lens initial position is always constant, and both a non-rotation influence and a shift in the angle of view before and after main exposure can be suppressed as compared to a case where the operation of the anti-vibration lens 94 required for the suppression of a non-rotation influence is performed in a movable range narrower than the anti-vibration lens-movable range.

Moreover, in a case where main exposure ends in the imaging device 10A, the anti-vibration lens 94 is centered and the imaging element 22 is moved to a position where a shift in the angle of view caused by the centering of the anti-vibration lens 94 is cancelled. Accordingly, a shift in the angle of view before and after the end of main exposure can be suppressed as compared to a case where the imaging element 22 is not moved despite the centering of the anti-vibration lens 94 in a case where main exposure ends.

A case where the limit setting processing shown in FIG. 13 is performed regardless of the characteristics of the imaging lens 14 has been described in the second embodiment, but the technique of the disclosure is not limited thereto. For example, the movable range-limiting processing shown in FIG. 13 may be performed by the CPU 74 only in a case where the amount of ambient light of the lens unit 18 of the imaging lens 14 is smaller than a threshold value (for example, 40%). A peripheral resolution may be used instead of the amount of ambient light to determine whether or not the limit setting processing shown in FIG. 13 is permitted to be performed.

In a case where the characteristics of the imaging lens 14 coincide with predetermined characteristics, the limit setting processing shown in FIG. 13 may be performed in the imaging device 10A in this way by the CPU 74. Accordingly, it is possible to avoid unnecessarily performing the limit setting processing shown in FIG. 13 as compared to a case where the limit setting processing shown in FIG. 13 is performed regardless of the characteristics of the imaging lens 14.

Further, a case where a state is changed to a state where main exposure for a static image is performed from a state where a live view image is displayed has been exemplified in each embodiment, but the technique of the disclosure is not limited thereto. The technique of the disclosure can also be applied to a case where a state is changed to a state where main exposure for a static image is performed from a state where a video is recorded during the display of a live view image in the video imaging mode. The technique of the disclosure can also be applied to a case where a state is changed to a state where main exposure for a static image is performed from a state where continuously taken images are displayed. Here, the state where continuously taken images are displayed refers to a state where continuously taken images, which are a plurality of images obtained from the continuous imaging of a subject performed by the imaging device, are immediately and continuously displayed on the display 28 according to an operation for continuously taking images. In this case, the continuously taken images are an example of a video according to the technique of the disclosure.

Furthermore, the imaging device on which the gyro sensor 70 is mounted has been described in each embodiment, but the technique of the disclosure is not limited thereto. For example, in a case where the gyro sensor 70 is not mounted on the imaging device, an electronic device on which a gyro sensor and/or an acceleration sensor are mounted is mounted on the imaging device and the gyro sensor and/or the acceleration sensor of the electronic device may be adapted to contribute to influence-suppression processing. Examples of the electronic device on which the gyro sensor and/or the acceleration sensor are mounted include a smart device.

Figure 17:
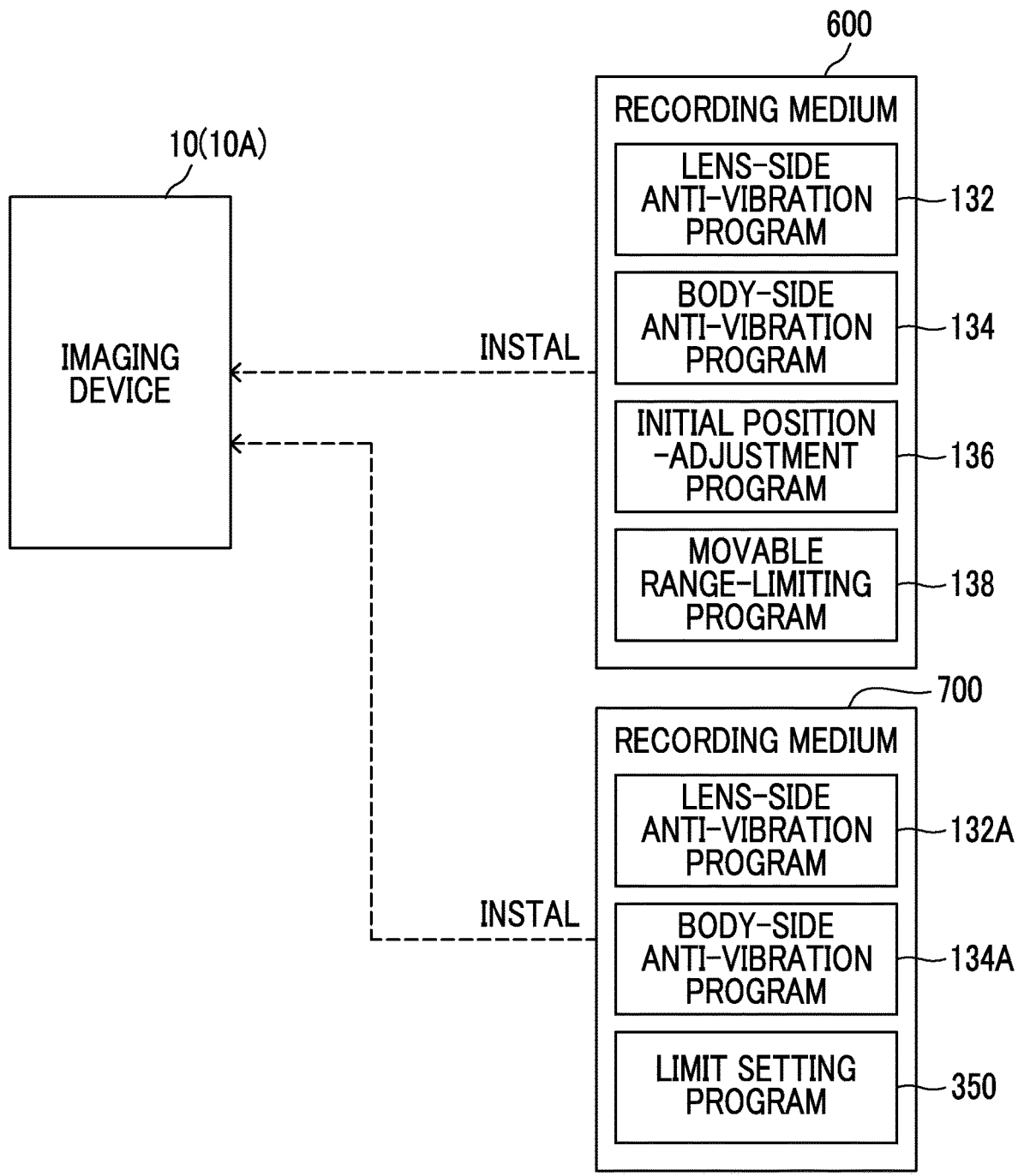
FIG. 17 is a conceptual diagram showing an example of an aspect where programs according to the first and second embodiments are installed on an imaging device body from a storage medium in which the programs according to the first and second embodiments are stored.

Further, a case where the programs are read from the secondary storage unit has been exemplified in each embodiment, but the programs do not necessarily need to be stored in the secondary storage unit from the beginning. For example, as shown in FIG. 17, the programs according to the first embodiment may be stored in a recording medium 600 first. In this case, the programs according to the first embodiment of the recording medium 600 are installed on the imaging device 10, and the installed programs according to the first embodiment are executed by the CPUs 74 and 108. Specifically, the lens-side anti-vibration program 132 is executed by the CPU 108, and the body-side anti-vibration program 134, the initial position-adjustment program 136, and the movable range-limiting program 138 are executed by the CPU 74.

Furthermore, for example, as shown in FIG. 17, the programs according to the second embodiment may be stored in a recording medium 700 first. In this case, the programs according to the second embodiment of the recording medium 700 are installed on the imaging device 10A, and the installed programs according to the second embodiment are executed by the CPUs 74 and 108. Specifically, the lens-side anti-vibration program 132A is executed by the CPU 108, and the body-side anti-vibration program 134 and the limit setting program 350 are executed by the CPU 74.

Moreover, the programs may be stored in storage units of other computers, a server device, or the like connected to the imaging device through a communication network (not shown), and may be downloaded in response to the request of the imaging device.

Further, the movable range-limiting processing, the lens-side anti-vibration processing, the body-side anti-vibration processing, and the limit setting processing described in each embodiment are merely examples. Accordingly, it goes without saying that unnecessary steps may be deleted, new steps may be added, or the sequence of the steps may be changed without departing from the scope of the disclosure.

Furthermore, general-purpose processors, such as the CPUs 74 and 108, have been exemplified in each embodiment, but the technique of the disclosure is not limited thereto. For example, dedicated processors may be used instead of the general-purpose processors, and distributed processing may be performed by a general-purpose processor and a dedicated processor.

Moreover, a case where the movable range-limiting processing, the lens-side anti-vibration processing, the body-side anti-vibration processing, and the limit setting processing are realized by software configuration using a computer has been exemplified in each embodiment, but the technique of the disclosure is not limited thereto. For example, at least one of the movable range-limiting processing, the lens-side anti-vibration processing, the body-side anti-vibration processing, or the limit setting processing may be adapted to be performed by only hardware configuration, such as FPGA or ASIC, instead of software configuration using a computer. At least one of the movable range-limiting processing, the lens-side anti-vibration processing, the body-side anti-vibration processing, or the limit setting processing may be adapted to be performed by configuration where software configuration and hardware configuration are combined with each other.

All documents, patent applications, and technical standards disclosed in this specification are incorporated in this specification by reference so that the incorporation of each of the documents, the patent applications, and the technical standards by reference is specific and is as detailed as each of the documents, the patent applications, and the technical standards.

The following additional remarks will be further disclosed in regard to the above-mentioned embodiments.

ADDITIONAL REMARKS

An imaging device including:

a lens-side suppression unit that moves an anti-vibration lens, which is provided in an interchangeable imaging lens mounted on an imaging device body including an imaging element receiving reflected light representing a subject as a subject image, to a position, which is determined according to a detection result of a detection unit detecting vibration applied to a device, to suppress an influence of the vibration on the subject image;

an imaging element-side suppression unit that moves the imaging element to suppress a shift in an angle of view caused by the movement of the anti-vibration lens; and a processor that is adapted to perform control on the lens-side suppression unit to limit a movable range of the anti-vibration lens, which is moved by the lens-side suppression unit, on the basis of an imaging element-side maximum shift amount which is the amount of the maximum shift in the angle of view caused by the movement of the imaging element performed by the imaging element-side suppression unit.

What is claimed is:

1. An imaging device comprising:

an optical image stabilizer that moves an anti-vibration lens, which is provided in an interchangeable imaging lens mounted on an imaging device body including an image sensor receiving reflected light representing a subject as a subject image, to a position, which is determined according to a detection result of a detector detecting vibration applied to a device, to suppress an influence of the vibration on the subject image;

a body image stabilizer that moves the image sensor to suppress a shift in an angle of view caused by the movement of the anti-vibration lens; and a controller that performs control on the optical image stabilizer to limit a movable range of the anti-vibration lens, which is moved by the optical image stabilizer, on the basis of an image sensor-side maximum shift amount which is the amount of the maximum shift in the angle of view caused by the movement of the image sensor performed by the body image stabilizer.

2. The imaging device according to claim 1, wherein the controller performs control on a display, which displays an image, to display the subject image, which is received by the image sensor, as a video, and performs control on the optical image stabilizer to suppress the influence by moving the anti-vibration lens to the position that is determined according to the detection result in a limited movable range, which is a movable range limited to be equal to or narrower than an image sensor-movable range that is the maximum movable range of the image sensor moved by the body image stabilizer, during the display of the video on the display in a case where the image sensor-side maximum shift amount is smaller than a lens-side maximum shift amount, which is the amount of the maximum shift in the angle of view caused by the movement of the anti-vibration lens performed by the optical image stabilizer.

3. The imaging device according to claim 2, wherein the limited movable range is determined on the basis of the image sensor-movable range.

4. The imaging device according to claim 2, wherein the limited movable range is determined on the basis of the image sensor-movable range and a focal length of the imaging lens.

5. The imaging device according to claim 2, further comprising:

a focus lens, wherein the limited movable range is determined on the basis of the image sensor-movable range, a focal length of the imaging lens, and a position of the focus lens.

6. The imaging device according to claim 2, wherein the controller performs control on the optical image stabilizer to center the anti-vibration lens in the limited movable range by the time when a main exposure-start condition where the image sensor is to be caused to start main exposure is satisfied and the main exposure is started.

7. The imaging device according to claim 1, wherein the controller performs control on the optical image stabilizer to move the anti-vibration lens in a direction of the centering in a limited movable range, which is a movable range limited to be equal to or narrower than an image sensor-movable range that is the maximum movable range of the image sensor moved by the body image stabilizer, in a case where a lens-side shift amount that is the amount of shift in the angle of view caused by the centering of the anti-vibration lens exceeds the image sensor-side maximum shift amount, by the time when a main exposure-start condition where the image sensor is to be caused to start main exposure is satisfied and the main exposure is started.

8. The imaging device according to claim 7, wherein the controller performs control on the optical image stabilizer to suppress the influence by moving the anti-vibration lens to the position that is determined according to the detection result in an anti-vibration lens-movable range, which is the maximum movable range of the anti-vibration lens, after the anti-vibration lens is moved to an initial position at which an operation of the anti-vibration lens required for the suppression of the influence is started and which is determined according to a degree of difference between the lens-side shift amount and the image sensor-side maximum shift amount.

9. The imaging device according to claim 1, wherein the controller performs control on the image sensor body image stabilizer and the optical image stabilizer to center the image sensor with an end of the main exposure of the image sensor and to move the anti-vibration lens to a position where a shift in the angle of view caused by the centering of the image sensor is suppressed.

10. The imaging device according to claim 1, wherein the controller performs control on the optical image stabilizer to limit the movable range of the anti-vibration lens, which is moved by the optical image stabilizer, on the basis of the image sensor-side maximum shift amount in a case where a characteristic of the imaging lens coincides with a predetermined characteristic.

11. An imaging control method comprising:

performing control on an optical image stabilizer to limit a movable range of an anti-vibration lens, which is moved by the optical image stabilizer, on the basis of an image sensor-side maximum shift amount which is the amount of the maximum shift in an angle of view caused by the movement of an image sensor performed by a body image stabilizer of an imaging device, the imaging device including the optical image stabilizer that moves the anti-vibration lens, which is provided in an interchangeable imaging lens mounted on an imaging device body including the image sensor receiving reflected light representing a subject as a subject image, to a position, which is determined according to a detection result of a detector detecting vibration applied to a device, to suppress an influence of the vibration on the subject image, and the body image stabilizer that moves the image sensor to suppress a shift in the angle of view caused by the movement of the anti-vibration lens.

12. A non-transitory computer-readable storage medium storing a program for causing a computer to execute processing including: performing control on an optical image stabilizer to limit a movable range of an anti-vibration lens, which is moved by the optical image stabilizer, on the basis of an image sensor-side maximum shift amount which is the amount of the maximum shift in an angle of view caused by the movement of an image sensor performed by a body image stabilizer of an imaging device, the imaging device including the optical image stabilizer that moves the anti-vibration lens, which is provided in an interchangeable imaging lens mounted on an imaging device body including the image sensor receiving reflected light representing a subject as a subject image, to a position, which is determined according to a detection result of a detector detecting vibration applied to a device, to suppress an influence of the vibration on the subject image, and the body image stabilizer that moves the image sensor to suppress a shift in the angle of view caused by the movement of the anti-vibration lens.

\* \* \* \* \*